(12) United States Patent
Turchetti

(10) Patent No.: US 6,730,219 B2
(45) Date of Patent: May 4, 2004

(54) FILTER FOR LIQUID PRODUCTS

(76) Inventor: Attilio Turchetti, Highway BR-060, Km. 213/233, Goiania city, GO (BR)

( * ) Notice: Subject to any disclaimer, the term of this patent is extended or adjusted under 35 U.S.C. 154(b) by 0 days.

(21) Appl. No.: 10/202,467

(22) Filed: Jul. 24, 2002

(65) Prior Publication Data

US 2003/0042194 A1 Mar. 6, 2003

(30) Foreign Application Priority Data

Jul. 25, 2001 (BR) ............................................. PI0104000

(51) Int. Cl.$^7$ ........................ B01D 29/68; B01D 29/25; B01D 33/50; B30B 9/14
(52) U.S. Cl. ........................ 210/237; 210/250; 210/108; 210/388; 210/393; 210/408; 210/411; 210/415; 100/117
(58) Field of Search ................................ 210/237, 250, 210/415, 408, 411, 388, 393, 108, 414, 356, 249, 95, 236; 100/117

(56) References Cited

U.S. PATENT DOCUMENTS

| | | | | |
|---|---|---|---|---|
| 2,843,267 A | * | 7/1958 | Andrson | |
| 2,975,903 A | * | 3/1961 | Ulrich | |
| 3,310,171 A | * | 3/1967 | Schmidt, Jr. et al. | |
| 3,680,702 A | * | 8/1972 | Weinstein | |
| 5,858,228 A | * | 1/1999 | Turcheti | |

* cited by examiner

Primary Examiner—Thomas M. Lithgow
(74) Attorney, Agent, or Firm—Herbert Dubno

(57) ABSTRACT

The filter has a framework with an inlet end, a solids outlet end and an outlet for a separated product between the ends. A fabric filter extends in the framework from end to end and is supported by movable rings, resilient members and dampers enabling axial extension and contraction of the filter. The resilient members, rings and dampers form a unit removable from the framework. A propeller turbine extends through the filter and is supported at opposite ends, and a drive is coupled with the turbine at the one end of the framework. A quick assembly/disassembly mechanism with a rail extends along the framework and is engageable with its cap for removing same and affording access to the unit enabling withdrawal of the unit from said framework and reinsertion of a filter unit composed of a filter and respective movable rings, resilient members and dampers.

22 Claims, 17 Drawing Sheets

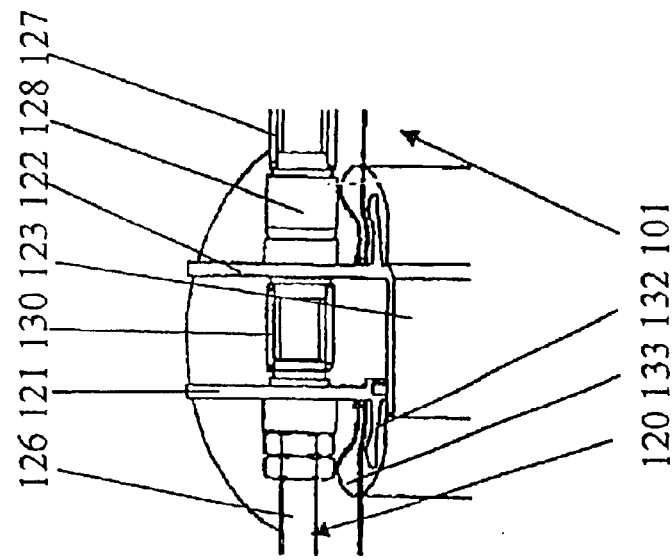
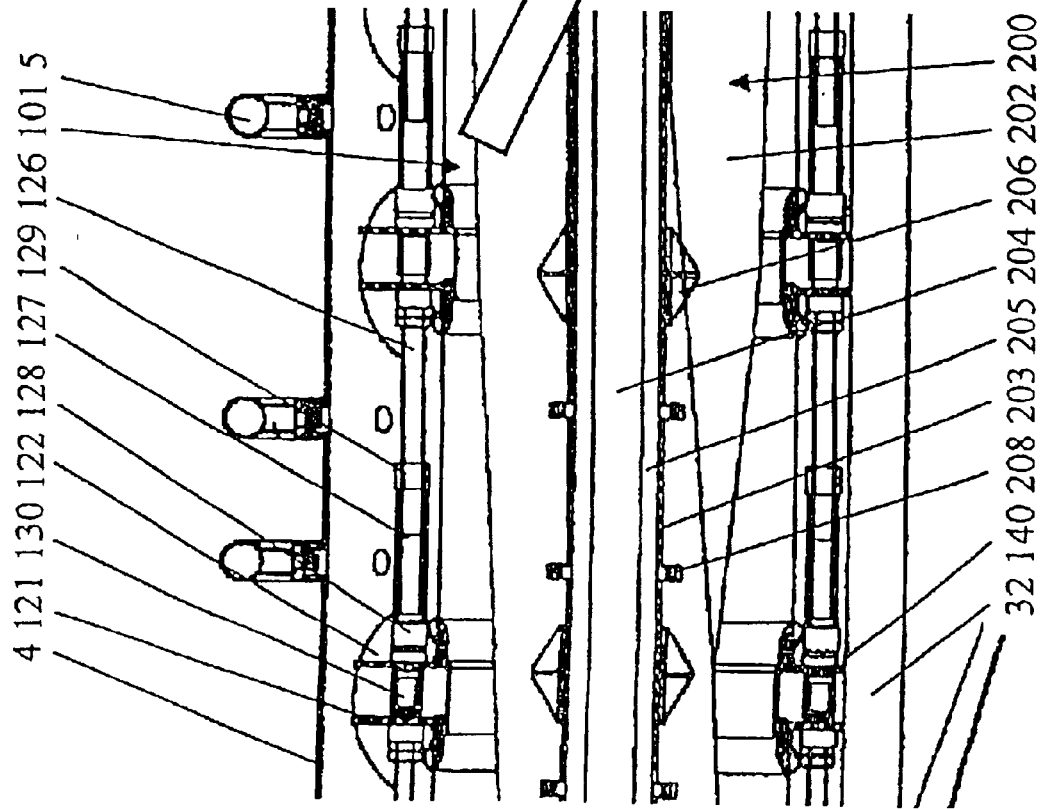

FILTER FOR LIQUID PRODUCTS

FIELD OF THE INVENTION

The present invention relates to a filter for separating suspended solids from a liquid and, more particularly, for a filter which can be used for separating a juice or sap from solids.

BACKGROUND OF THE INVENTION

Filters can be used to separate solids in suspension within liquid products, particularly to separate insoluble solids from soluble solids and liquids in a suspension, like citric juices, and which has been developed to carry out the filtering process and to also provide for the simultaneous separation of juice sap (brix) and a self-cleaning effect on the filtering sleeve by rinsing.

Generally the filter is also provided with a device to enable the filtering sleeve to absorb overpressures resulting from the filtering process dynamics and a device to enable quick assembly/disassembly to effect possible maintenance.

The filter can be associated with a circuit for one or more filters, providing for: feeding of product to be filtered, removal of the filtered material, removal of solids, counter-washing and filter cleaning operations. The circuit can incorporate a safety device against eventual disruption of the filtering sleeve and devices enabling the filter to work in an open or closed circuit, all with the purpose of meeting the needs of interested parties for this kind of equipment.

A filter to separate liquids from solids is already known and essentially comprises a filter body, of which an end includes the outlet for the product to be filtered; the intermediate region of said body holds a set comprising: a filtering element with cylindrical tube screen shape, which inlet communicates with the inlet of the filtering body and a rotor within the filtering element operated by a driving set which promotes the circulation of product to be filtered. In its lower part, the middle region of the body provides an outlet for the filtered material. The opposite end of said body provides the outlet for solids, with which the outlet of the filtering element communicates. The body is assembled on a rack by means of a device to regulate its inclination.

The rotor is provided with an entry path equipped with a turbine imparting axial movement to the product being fed and a processing path equipped with flat radial blades imparting radial movement to the liquid, so that it can go through the filtering element.

Finally, the rotor may include a cleaning device for the filtering element, comprising a helix-twisted wire around processing radial blades, staying near the internal face of the filtering element, mechanically dragging the solid material retained in the filtering element until it is fully withdrawn.

The use of this filter has few drawbacks. When the liquid comes from the inlet stage to rotor processing, the axial hydrodynamic impelling force is largely reduced, so that the liquid is concentrated and most of it goes through the initial region of the filtering element. This subjects the filtering element to different forces and, depending on the material with which it is manufactured and the magnitude of such forces, elastic deformation may occur, thus compromising a better performance of said filtering element.

As a consequence, only a small part of the filtering element effectively acts to process the material.

OBJECT OF THE INVENTION

A first object of the invention is therefore to eliminate the problems with earlier filter.

SUMMARY OF THE INVENTION

This object is attained with a filter unit which comprises:
- a filtering sleeve made of technical material (canvas) communicating with the inlet and outlet of the filter body; and
- a turbine with two helicoidal paths, namely, a short helix-shaped inlet path, located in an inlet chamber of the filter body and imposing axial thrust and no radial thrust to the liquid, and a long helix-shaped processing turbine path, located inside the filtering sleeve. The processing path is equipped with blades with convex trailing surfaces keeping an appropriate spacing (gap) relative to the filtering sleeve and imposing highly intense radial thrust and low axial thrust to the liquid, so to displace it according to a vortex inside the sleeve.

This kind of filter construction solves the drawbacks of the usual one, since the loss of hydrodynamic thrust between both turbine paths is minimized, thus avoiding the concentration of liquid in the beginning of the sleeve and eliminating the different forces which can cause elastic deformation and loss of efficiency. This construction also provides that the whole surface of the sleeve acts effectively during processing. Another effect provided by the turbine, as described above, is the running out of the liquid along the internal surface of the filtering sleeve before passing through it, which means that it drags the solid material towards the exit. This provides a hydrodynamic self-cleaning effect by means of simultaneously rinsing the filtering sleeve while filtering. This kind of self-cleaning of the sleeve prevents the solid material from being compressed against it, possible crushing of said material, clogging of the sleeve, as in conventional filters.

Usually, and especially while processing citric juices, the pulp resulting from separation processes effected with usual filters still contains soluble solid material (brix), constituting the best part of the product being processed. Separation of the soluble solid material from the insoluble solid material while using conventional filters can only be done in appropriate equipment, located downstream from the filters in a processing line. This is undesirable, since it requires the additional equipment to extract brix, means to circulate the pulp from the filters to such equipment, etc. Besides the need for the additional equipments per se, it also requires that additional process stages be provided, thus adding complications and costs to the process.

The present filter can overcome such problems. For that, the filter includes a circuit to separate brix, comprising radial nozzles provided within the turbine axis, which inject pressured water, radially crossing the liquid being filtered and the solid material retained in the sleeve, while separating brix.

The circuit solves the problems occurred when using conventional filters, since it eliminates the need for specific equipment and process stages to separate brix downstream from the filters, as usually occurs. Optionally, the brix separator device has the radial nozzles in the axis and/or injecting nozzles provided in the framework injecting pressured water in the outlet region for solids in the filtering sleeve.

The flat profile of blades of the conventional filters generates relatively high resistance strength to rotor movement, thus requiring the use of sufficient engine power to rotate the rotor, drag the liquid to be processed and overcome the resistance. This results in the need for a relatively high power motor, which is undesirable.

The helicoidal profile of turbine blades of the present filter and their spacing from the filtering element provides for lower resistance, thus enabling the use of lower power motors in comparison to conventional filters with flat blades.

Another feature of a conventional filter is that its filtering element is fixed to the filter body. Therefore, when the filtering element is subjected to forces incurred from the filtering process dynamics, its stretches, is subject to elastic deformation and compromises its filtering capacity and/or, in extreme cases, can also suffer irreversible deformation or rupture.

The filter of the invention overcomes this problem in part in that the liquid flows as a vortex, thus minimizing the direct impact against the sleeve. The filtering sleeve of the filter of the invention sealed on a resilient support, keeping it stretched under normal internal pressure conditions, allowing it to axially contract and radially expand when internal pressure increases. Therefore, the filtering sleeve absorbs the forces without suffering significant elastic deformation, keeping its filtering ability as pressure increases. When the pressure peak is over, the resilient support allows the sleeve to return to its normal configuration.

Another problem caused by conventional filters, when equipped with a filtering element in the form of a steel screen, is that the openings of the filtering element define cutting edges, near which free edges of the rotor flat blades pass. The joint action of said edges of the filtering element and the free edges of rotor blades while moving facilitates smashing of most of the solid part of the material to be processed and fragments go through the filtering element, thus creating a cloudy filtered product still containing fragmented solids, which is undesirable. The filtering elements in the form of a steel screen can still provide for external reinforcing bars. This fact, in combination with other features of the steel filtering element and the filtering process dynamics itself can produce turbulence in the material being processed, thus facilitating the incorporation of air and some opacity, which is undesirable.

This problem is overcome by the invention since the filtering sleeve is made of a fabric (canvas) with round section wires, thus avoiding the cutting edges. The lack of edges and some flexibility of the wire constituting the sleeve eliminates the tendency for the processed material to be fragmented and the incurred problems, as explained above. The circular section of the wires also facilitates a certain Venturi effect, which contributes to passing the liquid phase of the material through the sleeve.

Another problem with a conventional filter is that, depending on the concentration of the retained solid material, the twisted-wire cleaning device presses the retained solids against the filtering element, which may cause blockage and apply additional forces to the filtering element thus straining the equipment. The solid phase of the material can be crushed and consequently the quality of the final filtered product reduced.

This drawback is overcome by the self-cleaning effect by rinsing as provided by the turbine of the present filter, as described above.

Due to the characteristics of the filtering process as effected by that kind of filter, periodical cleaning and eventual maintenance operations of the filter are necessary, thus requiring interruptions.

The present filter reduces cleaning and maintenance interruptions as much as possible. To that effect, the filter includes a range of devices intended for quick assembly/disassembly. The filtering sleeve and its resilient support are assembled one next to the other, so to constitute a monoblock set. The filter body also includes a removable cap provided at its outlet end for solids. The cap and the opposed end of the filter body provide ring surfaces for the connection of the filtering sleeve. The body cap is provided with a removable bearing housing for the turbine axis and the opposed end of the filter is provided with an axis support. The lower part of the filter body and the filtering sleeve and support set are provided with parts of a support and sliding guiding device for the sleeve/support set. Assembled on the filter body, a rail set is provided, on which the cap and subsequently the sleeve and support set can be suspended or vice versa, to assembly/disassembly the filter. These devices when jointly working provide for quick assembly/disassembly of the filter, thus reducing the interruption period for eventual maintenance operations. On the other hand, the filter is provided with an associated set, essentially comprising: inlet tubes for the product, an outlet for the filtered product, an outlet for solid material, devices water and counterwashing solution injection; a set of automatic control and drainage valves for various lines of the flow circuit; motor-pump sets; a safety device against filtering sleeve disruption and a computerized device (PLC) for the command of the valves and pumps, among others, performing the filter set cleaning operations in a quick and efficient way.

The invention also includes the assembly of a processing unit for liquids, which may consist of one or various filters working in an open or closed circuit, so to meet as many needs as possible from the interested parties in this kind of equipment.

BRIEF DESCRIPTION OF THE DRAWING

The above and other objects, features, and advantages will become more readily apparent from the following description, reference being made to the accompanying drawing in which:

FIG. 5 is an enlarged detailed section of an intermediate part of the filter;

FIG. 5A is a detail of FIG. 5 in which a stage of the filtering sleeve and resilient support set is shown;

FIG. 9 shows the filter and rail;

FIG. 10 shows the filter and rail while disassembling the filter cap;

FIG. 11 shows the filter and rail while disassembling the monoblock set of filtering sleeve and resilient support;

FIGS. 14 and 15 ar views similar to FIGS. 1A and 2 respectively which show the filter as assembled in a closed circuit, and in which FIG. 14 is a side view and FIG. 15 is a cross section of the filter.

SPECIFIC DESCRIPTION

Figure 1A:
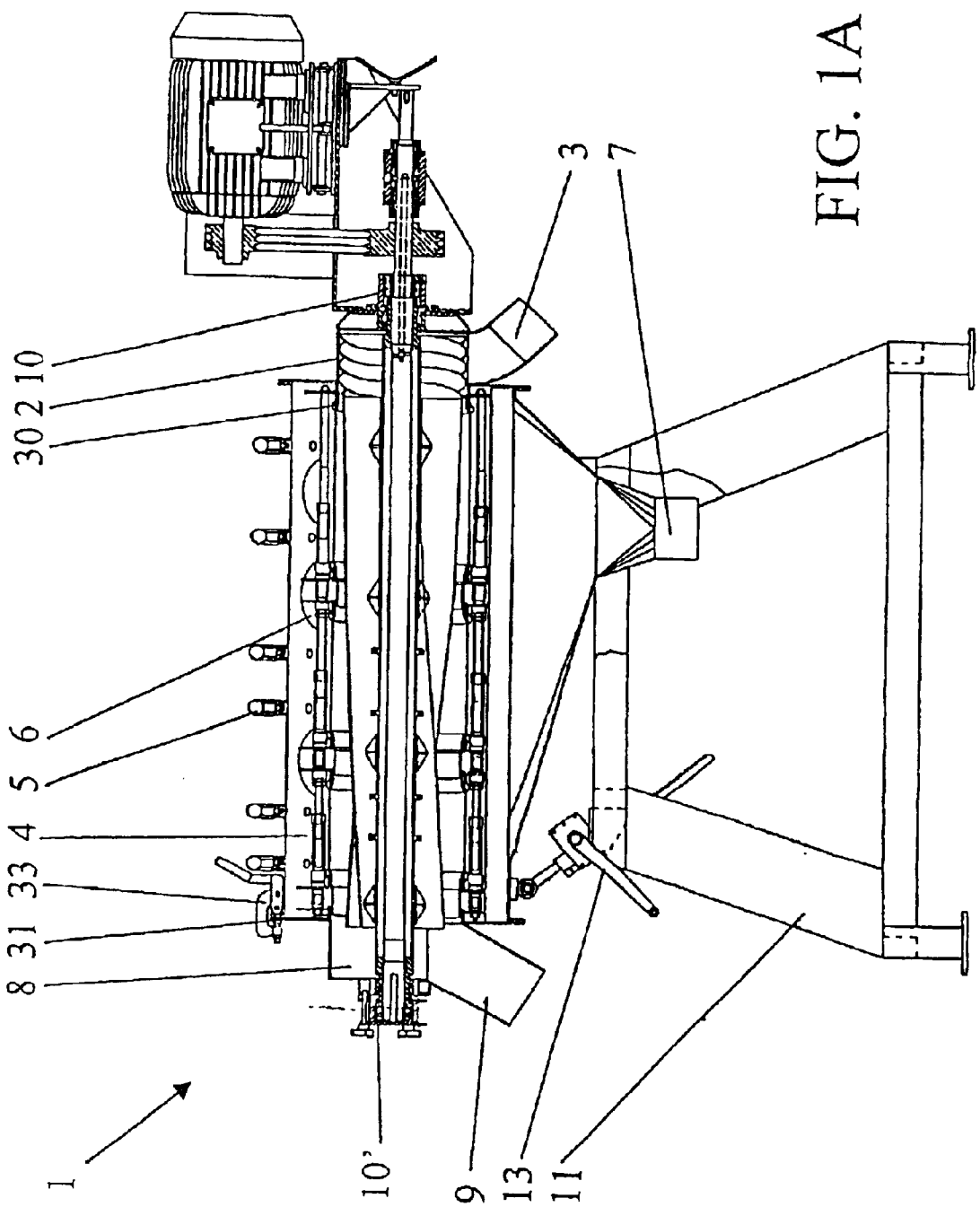
FIGS. 1A, 1B and 1C show a side elevational view of the filter, partly broken away the framework, the filtering element and the respective sets of reference numerals for turbine, respectively, to facilitate reading.
Figure 1B:
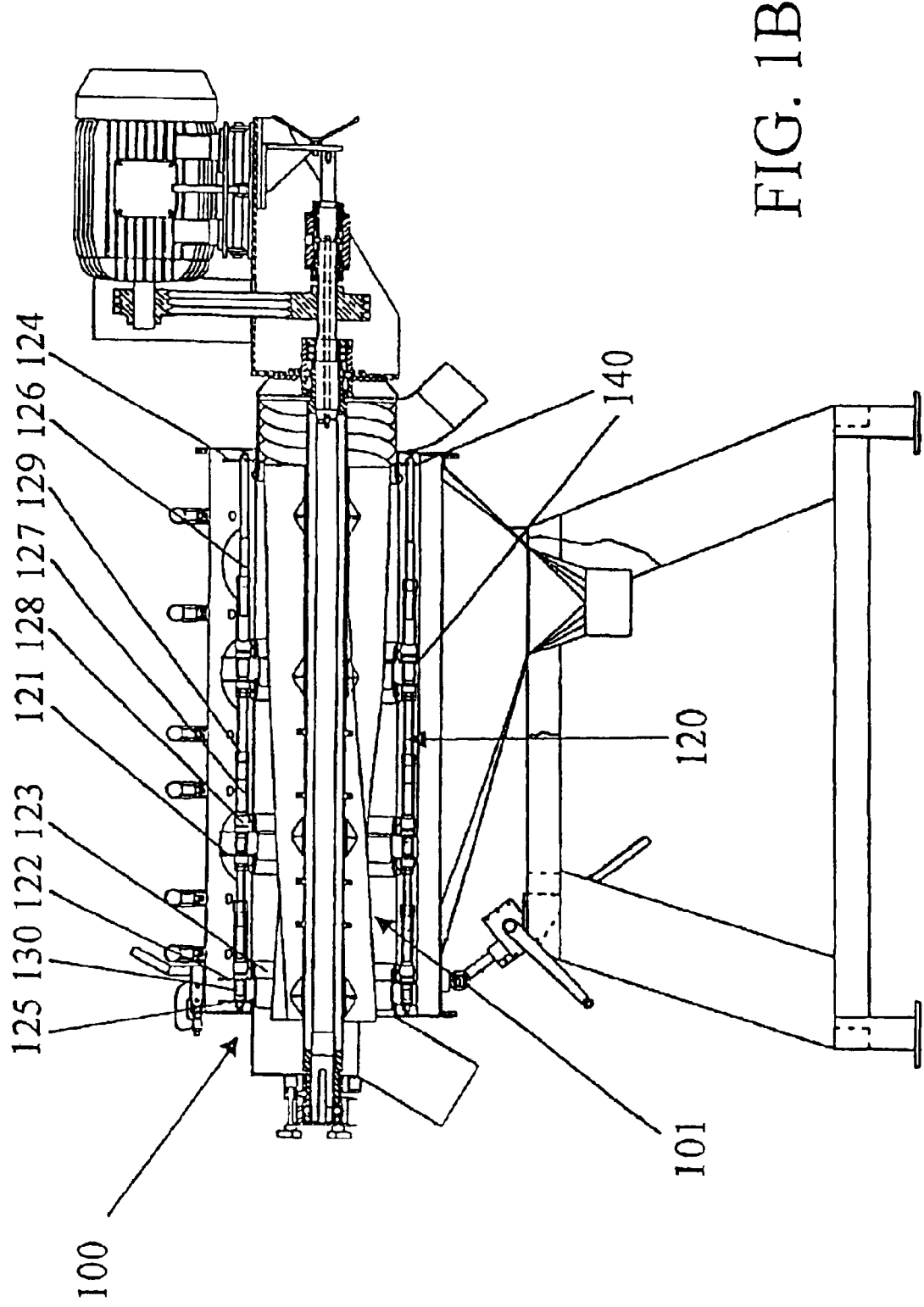
Figure 1C:
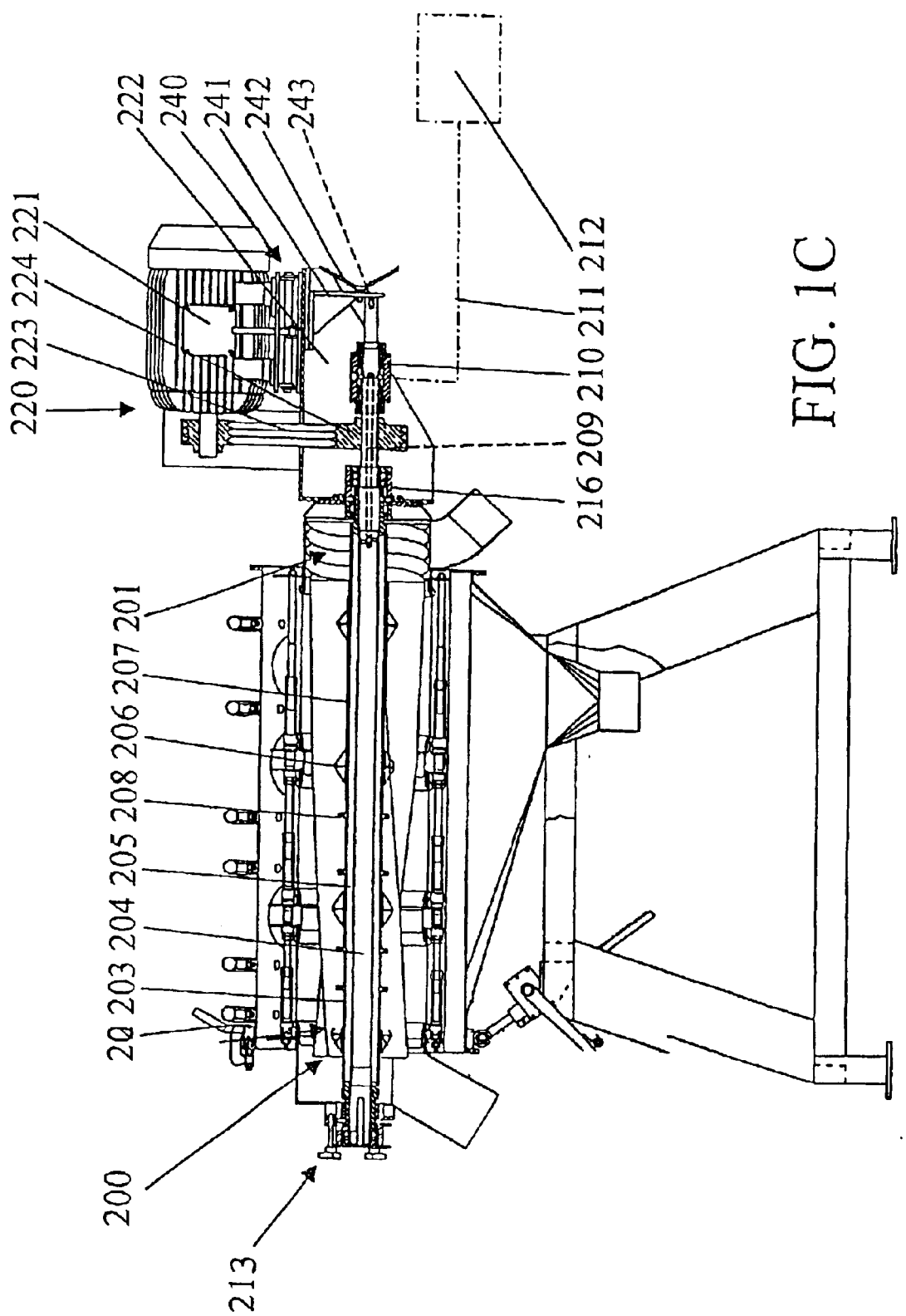

The filter of the present patent of invention essentially comprises a framework, a filtering element set 100 located inside the framework, a propeller turbine 200 for the product to be filtered and located within the framework and filtering element; and a hydraulic circuit 300 to feed the product to be filtered, for separation of the filtered product and for separation of retained solids, counterwashing and washing associated to the filter (see FIGS. 1A–1C).

The framework 1 (FIGS. 1A, 2, 3, 4, 5 and 8) comprises a cylindrical inlet chamber 2 coaxially located at one end and connected with an inlet tube 3 intended to feed the product to be filtered. An intermediate framework path follows with a larger diameter than the inlet chamber 2, in which the product is processed. A set of injecting nozzles 5 extends along the framework for liquid to counterwash the filtering element set 100 (FIG. 1B), the nozzles being arrayed around the intermediate framework path. Displays or windows 6 (FIGS. 1A and 9). An outlet tube for the filtered material 7 is located at the lower part of said intermediate framework path 4. The cap 8 serves to close the framework 1 at the end which is opposite the chamber 2. An outlet tube for solids 9 extends from the cap 8. Housings 10, 10' for turbine bearings, (for turbine 200, FIG. 1C) are located on the wall of the inlet chamber 2 and in the middle of the cap 8. A rack 11, on which the framework 1 is seated (FIGS. 1, 2 and 3) supports the apparatus. FIG. 1A also shows a device which serves to regulate the inclination of the filter and comprises hinges 12 along the framework 1 and for its connection to the rack 11 and a monkey hammer set 13 located under the end of the framework containing the outlet for solid material and which can position the solid outlet higher than the filter inlet, under any appropriate inclination, so that gravity also acts in the filtering process, according to the product to be filtered.

The filtering element set 100 (FIGS. 1B, 4, 5 and 8) essentially comprises a filtering sleeve 101 made of canvas (technical material), i.e. a fabric, with one of its ends communicating with the inlet chamber for the product to be filtered. An intermediate region of the sleeve is located along the intermediate part of the framework 4 and communicates with the lower outlet 7 for the filtered product and the opposite end of the sleeve communicates with the outlet 9 for solids.

The filtering element set 100 also comprises a resilient support set 120 on which the filtering sleeve is located and which is positioned in the framework 1 and enabling the sleeve 101 to axially retract and radially expand, so to absorb possible pressure increases which may occur within the sleeve while the filter is working, due to the dynamics of the filtering process itself.

The filtering sleeve 101 may be a monoblock or built up in stages, as shown in the drawing, and is sewn with a substantially circular section wire.

The resilient support set 120 substantially comprises fixed intermediate flange rings 121 (FIGS. 1A and 5), on which the ends of the sleeve stages turned toward the feeding inlet of the filter are supported, and movable intermediate flange rings 122, on which the opposite ends of the sleeve stages turned toward the outlet for solids of the filter are supported.

The movable intermediate flange rings 122 have a ring projection 123 packed as a telescope within the immediately adjacent fixed intermediate flange rings 121. The resilient support 120 also comprises fixed end flange ring 124 (FIGS. 1A and 4), on which the inlet end of the first stage of filtering sleeve 101 is supported next to the inlet chamber 2 and the intermediate region 4 of the framework 1. A fixed end flange ring 125 (FIGS. 1A and 8), on which the outlet end of the last sleeve stage 101 is supported, is seated next to the intermediate region 4 and the cap 8 of the framework and enables the ring path 123 of the adjacent moving intermediate flange ring 122 to be received as a telescope. At least three, preferably six support stringers 126 are located lengthwise inside the frame 1, are arranged around the sleeve 101 and are equally distant one from the other, the stringers crossing peripheral openings on the flange rings 121, 122, 124 and 125. The movable intermediate flange rings 122 are slidingly assembled. The fixed end flange rings 124 and 125 are assembled fixed by means of nuts at the ends of the support stringers 126.

The resilient support 120 also comprises springs 127 which stretch the filtering sleeve stages 101, located around parts of the support stringers 126 between the fixed ring 121 and moving ring 122 or the fixed flange 124 and movable flanges 122. One of the ends of said stretching springs 127 are located against a region of the moving flange ring 122 projected beyond the filtering sleeve periphery 101 or against a bush of resilient material 128 located between the spring and the flange, around the support stringers 126. Nuts 129 are provided to regulate the pressure of the springs 127 and are seated on screw-equipped parts of the support stringers 126 and against which the ends of said stretching 127 opposite those against the flange 122 or bushes 128.

The resilient support set 120 also comprises dampers intended to absorb the impact to which the filtering sleeve stages are subject 101, at the end of the pressure increase inside it and return of stretching given by the springs 126. The dampers can comprise resilient gloves or springs 130 assembled around parts of the support stringers 126 located between the moving flange ring 122 of a sleeve stage 101 and a fixed flange ring 121 of a subsequent filtering sleeve stage 101 or between the moving flange ring 122 and the fixed ring 125 of the resilient support end 120 next to the outlet for solids.

In a preferred construction of the filter, the filtering sleeve 101 assembled on the resilient support 120 comprises stages, e.g. three stages, as shown in the drawing so that each stage comprises a filtering sleeve segment 101, fixed 121 or 124 and moving 122 flange rings, which are seated on the ends of the filtering sleeve path and on the support stringers 126, the stretching spring sets 127 and tensioning nuts 129, and the damper sets 130.

Figure 6:
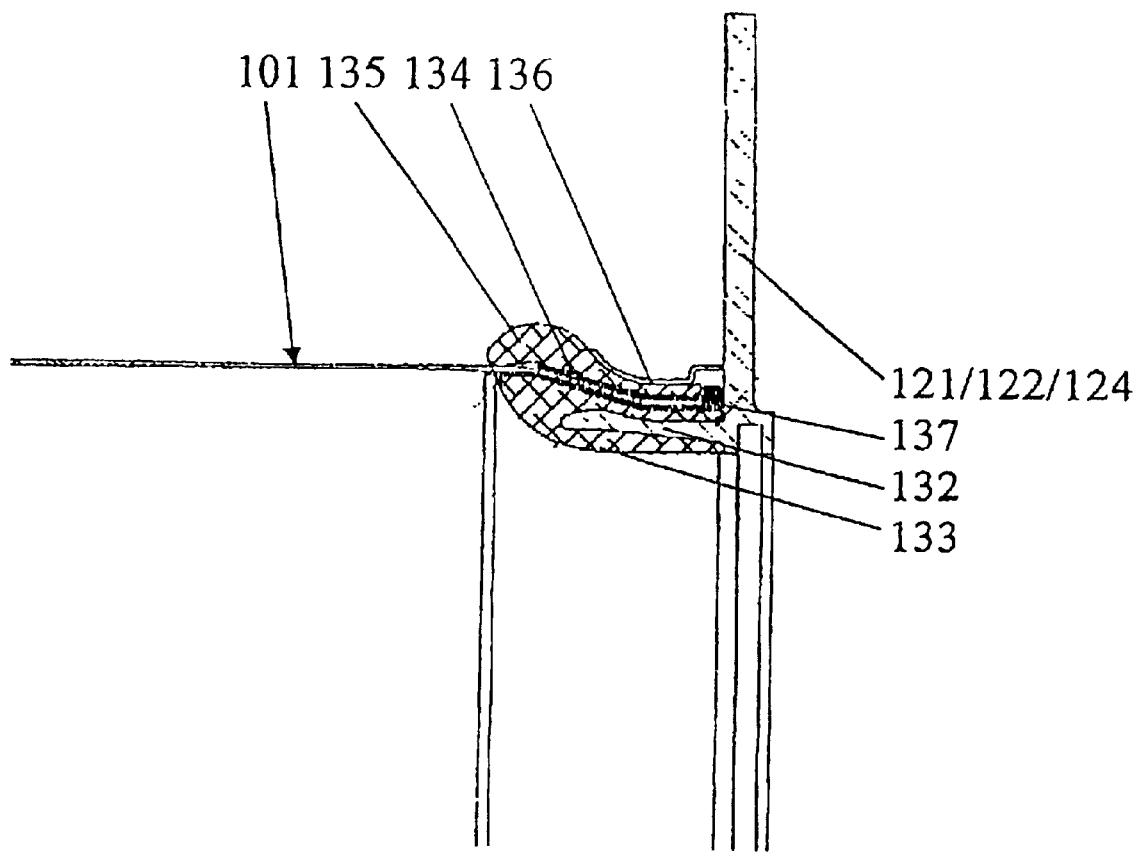
FIG. 6 is an enlarged detail of the device for seating the filtering screen in an end ring flange.

The filtering sleeve 101 is fastened on the fixed ring 121 and movable intermediate flange rings 122 and the end ring 124 by a fixing device essentially comprising a ring-shaped rim 132 (FIG. 6), orthogonally stretched from the flange ring face, a vulcanized rubber member 133 on said ring-shaped rim, a reinforced end 134 of the filtering sleeve which is externally seated on the rubber member 133, a rubber reinforcing ring 135 externally seated on said reinforced end 134 of the ring, and an apron or handle 136 externally encompassing the rubber reinforcing ring 135.

The rubber member 133 has an external surface defined by an end region of smaller diameter located next to the flange ring 121, 122 or 124 and is axially stretched until an intermediate region with growing diameter axially extending until an opposed end region with larger diameter and small axial extension. The reinforced end 134 of the sleeve is adjusted on said external surface and follows its profile. The internal surface of the rubber reinforcing ring 135 also follows the profile of the reinforced end 134 of the sleeve. The reinforcing ring 135 has an external surface defined by a substantially curved concave region of smaller diameter, adjacent to the flange ring 121, 122 or 124 bearing with a free edge against an edge rib 137 of the sleeve reinforcement 134 and, on the other hand, said external surface of the reinforcing ring 135 axially stretches and conforms to a curved convex part of larger diameter. The apron 136 encompasses the curved concave part of the external surface of the rubber reinforcing ring 135 and remains retained between the surface of the flange ring 121, 122 or 124 and the part of curved convex surface of the rubber reinforcing ring 135.

Figure 7:
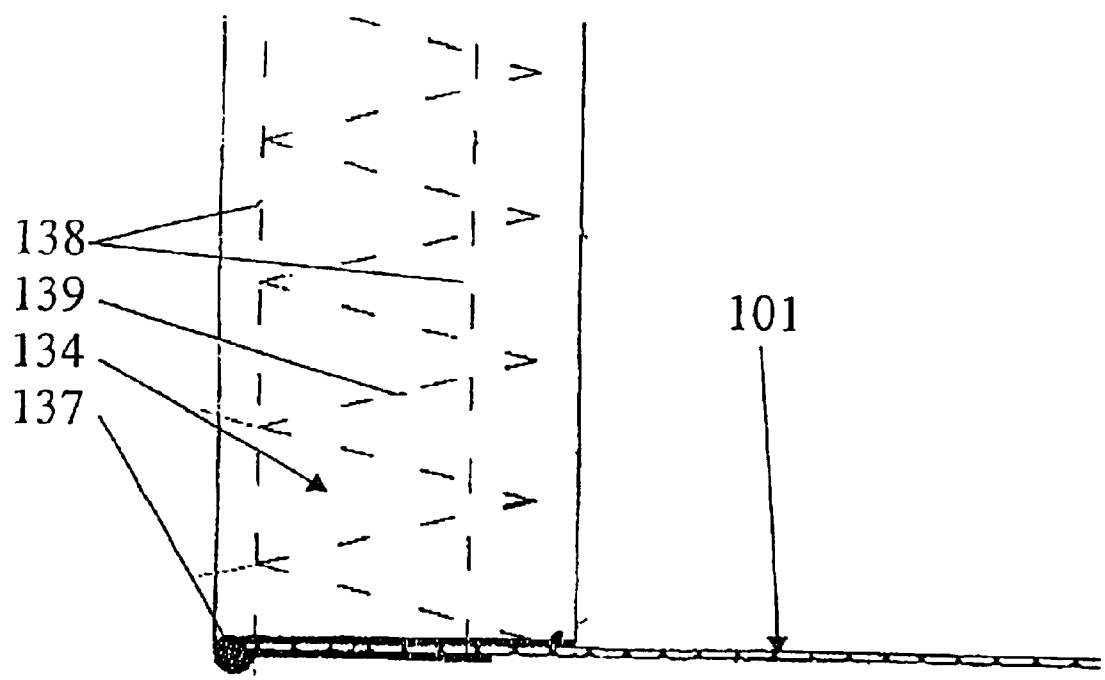
FIG. 7 is an enlarged detail of the reinforced seated end of the filtering screen.

The reinforced ring 134 of the filtering sleeve 101 (FIG. 7) comprises a strip-shaped blanket provided with a ring part covering the internal surface of the sleeve end. A fold incorporating the rib 137 is located at an edge of the sleeve end. A ring-shaped part covers the external surface of the sleeve end, with the strip-shaped blanket being fixed at the end of the sleeve by means of two parallel and circumferentially stretched seam lines 138 and a zigzag seam line 139, with oblique parts located at a 30° angle from each other which, on one side, form vertexes over the circumferential seam line 138 located nearer to the free end of the sleeve 101. The oblique parts cross the other circumferential seam line which is more distant from the end of the sleeve 101.

Figure 10:
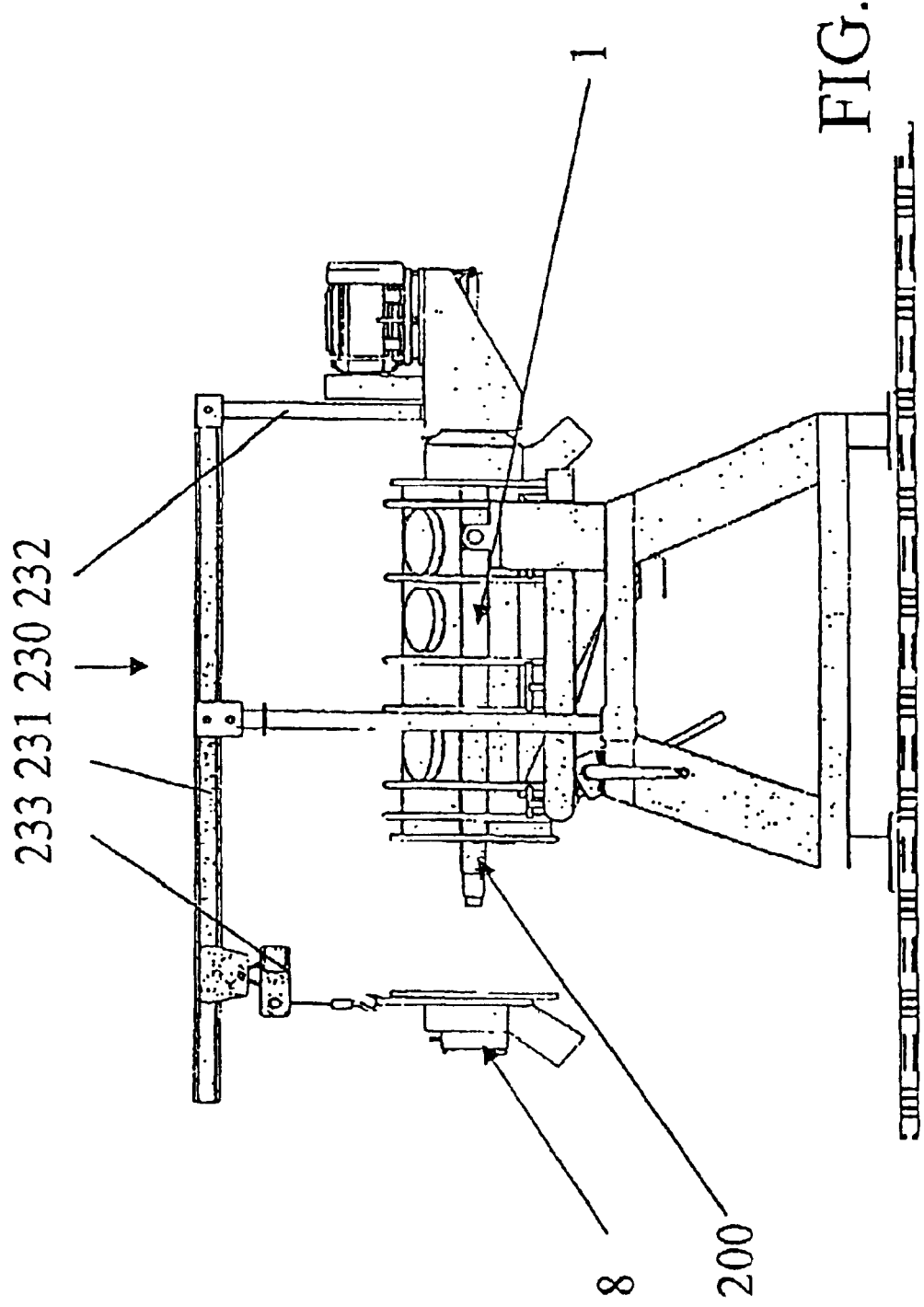

The propeller turbine 200 (FIGS. 1C, 3, 4, 5, 5A, 8, 8A and 8B) substantially comprises a helix-shaped inlet turbine part 201 with a short path located exactly within the inlet chamber 2 (FIG. 10) for the product to be filtered and able to impose axial thrust and substantially no radial thrust on the liquid entering via the inlet 3, so as to feed it into the filtering sleeve 101. The short path 221 is followed by a long helix-shaped processing turbine path 202, extending throughout the internal part of the sleeve 101 and able to impose a highly intense radial thrust and a low axial thrust upon the liquid, thus providing a self-washing effect by rinsing the sleeve 101 and simultaneous passage of the liquid through it and its filtering, as will be described later.

The propeller turbine 200 also comprises an axis consisting of:
  an external tube path 203, over which the blades of the turbine paths 201 and 202 are located an internal axis 204 located inside the external axis 203 and whose ends are reciprocal to those of the external axis and a ring chamber 205 defined between the parts of axis 203 and 204 which is a part of a device to separate the juice sap (brix) from the pulp of the filtered product as described later.

The long processing turbine path 202 preferably comprises four helicoidal blades extending around the axis, which have convex trailing surfaces; supports 206, each substantially in the shape of two cones connected by their larger bases (FIG. 5), incorporated around the axis and which have grooves in which the blades are seated; spaces 207 defined between the axis surface and blade edges intended to absorb pressure peaks generated during turbine auctioning and spaces (gaps) between the free ends of the blades and the internal surface of the filtering sleeve 101.

The device to separate juice sap (brix) from the pulp of the filtered product (FIGS. 1C, 4 and 5) substantially comprises the ring chamber 205 injecting nozzles 208 radially derived from the external tube axis 203 defining the ring chamber 205 and a duct 209 located in part of the internal axis 204 and communicating with the ring chamber 205 with a rotating joint 210 external to the framework 1. A rotating joint 210 (FIG. 4) is part of internal axis 204 and rotates and communicates its internal duct 209 with a circuit 211 supplying pressured water to separate the sap from the pulp and of which a motor-pump set 212 of itself is a part.

Optionally, the device to separate juice sap (brix) from the pulp of the filtered product comprises said injecting nozzles 208 and its associated components as described, and/or injecting nozzles 208' (FIG. 14), located on the cap 8 and injecting water through the outlet for solids of the filtering sleeve (101) said nozzles are connected to the pressured water feeding circuit 211–212.

Working jointly with the turbine 200, a bearing assembly is provided in the framework 1, essentially comprising a bearing set 213 (FIGS. 1A and 8) provided in the housing 10' of cap 8 of the framework 1 in which one of the ends of the internal shaft 204 is seated. The assembly also comprises bearings 214 which receive the end of the shaft and a sealing set 215 sealing against the shaft and opposed bearing set 216 (FIGS. 1A and 4) provided in the housing 10 provided on the wall of the inlet chamber 2 of the framework 1 traversed by an opposite part of the internal shaft 204, with such bearing comprising both bearings and seals.

A motor set 220 (FIG. 4) also works in cooperation with the turbine, and can include an electric motor 221 on a support 222 provided on the inlet end of the filter, a transmission comprising a belt 223 coupled at the motor output and to a pulley 224 of the internal shaft 204 of the propeller turbine.

Figure 12:
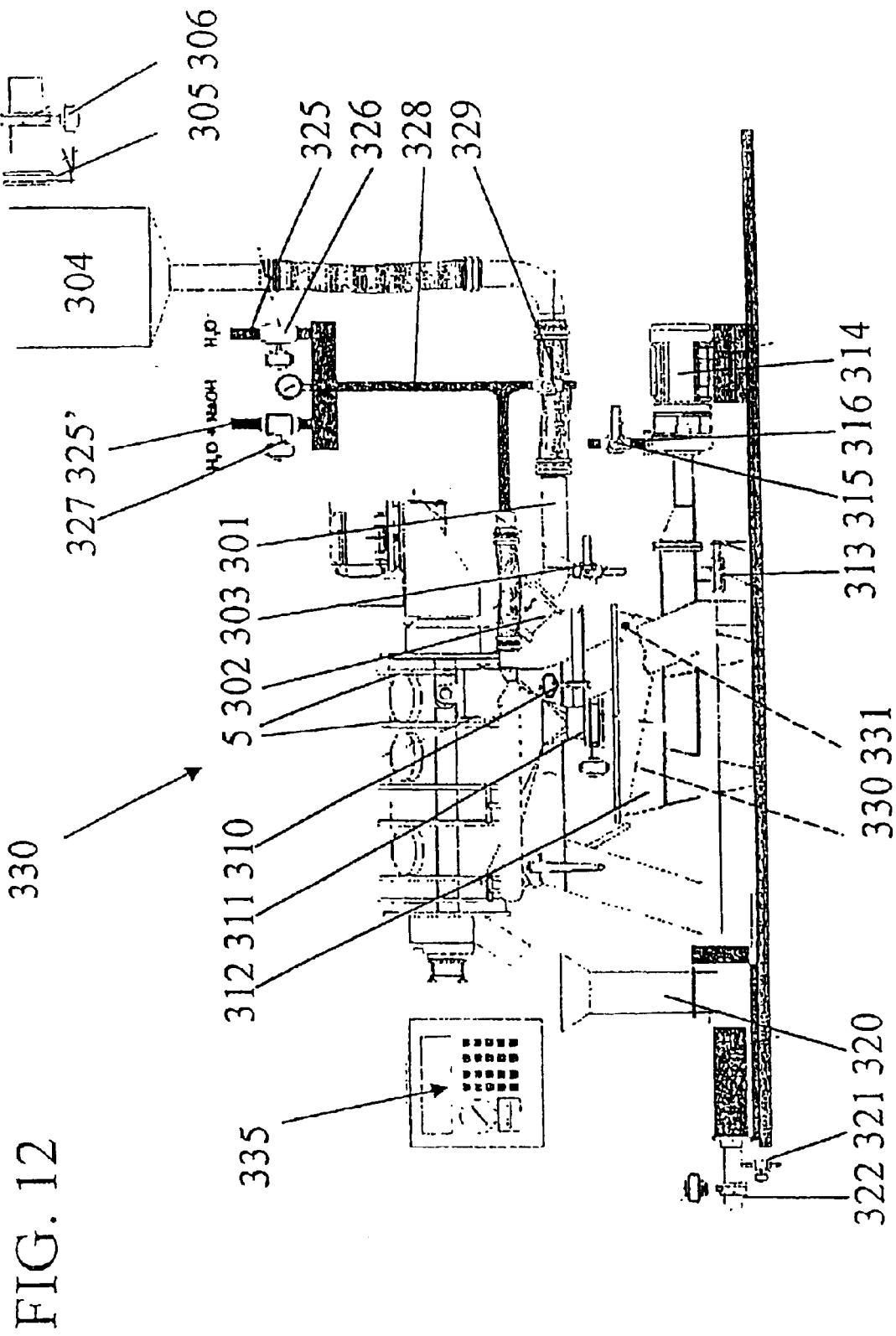
FIG. 12 is a diagram which shows a filter and a circuit associated to it, comprising the line to feed the product to be filtered, to serve as outlet for the filtered material, and to serve as outlet for solids and counterwashing.

The hydraulic circuit 300 (FIG. 12) to feed the product to be filtered, take out the filtered material, take out the retained solids, counterwashing and washing substantially comprises: tubes 301 to feed the product to be filtered, connected to the inlet duct 3 and having in sequence from said inlet duct a flow meter 302, a drain with a manual ball valve 303, optionally a tank 304 for storage of the product to be filtered, an automatic valve 305 and a manual valve 306 of the butterfly type provided at the tank inlet.

Outlet tubes for the filtered product are a part of the circuit and comprise:
  a drain with an automatic butterfly valve 310 derived from the lower outlet for filtered material 7 of the framework 1,
  an automatic butterfly valve 311 to command the outlet of the filtered material provided at the filtered product outlet 7 downstream from the drain 310, a tank 312 (used in open circuits) provided under the outlet command valve 311,
  a drain with an automatic butterfly valve 313 and a motor-pump set 314 provided at the outlet of the tank 312 a manual ball valve 315 and a suppression line 316 provided at the pump outlet 314.

Outlet tubes for solids are a part of the circuit and comprise:
  pump 320, with the inlet receiving the outlet 9 for solids from the filter,
  a drain with an automatic spherical valve 321, and
  an automatic butterfly valve 322 provided downstream from that and both provided at the pump outlet 320.

The circuit also comprises feeding tubes for the counterwashing device 5, comprising: tubes 325 for water ($H_2O$) provided with an automatic spherical valve 326; tubes 325' for caustic solution (H$_2$O+NaOH) provided with an automatic spherical valve 327; tubes 328 to feed the filter counterwashing nozzles 5 and to which tubes for water 325 and caustic solution 325' are alternatively connected; and a drain with a manual ball valve 329 derived from the tubes 328 to feed the filter counterwashing nozzles 5.

The circuit also provides a safety device against disruption of the filtering sleeve 101, essentially comprising a pulp retaining grill 330 assembled within the outlet tank for the filtered material 312, at an appropriate distance from its opening, and a level sensor 331 provided above the pulp retaining grill 330.

The circuit also includes a dedicated software based computer (PLC) 335, appropriately connected to the automatic valves, pumps and level sensor 331 of the circuit, so as to implement a process of working, filter counterwashing and monitoring of eventual disruptions of the sleeve 101.

The present filter is generally for industrial plants designed for large productivities, such as citrus processing plants, and may be solely used or be a part of a set of filters connected in series. Therefore, eventual cleaning and/or maintenance operations of the filter need to be done within short deadlines to minimize interruptions and thus not adversely affecting productivity.

Figure 2:
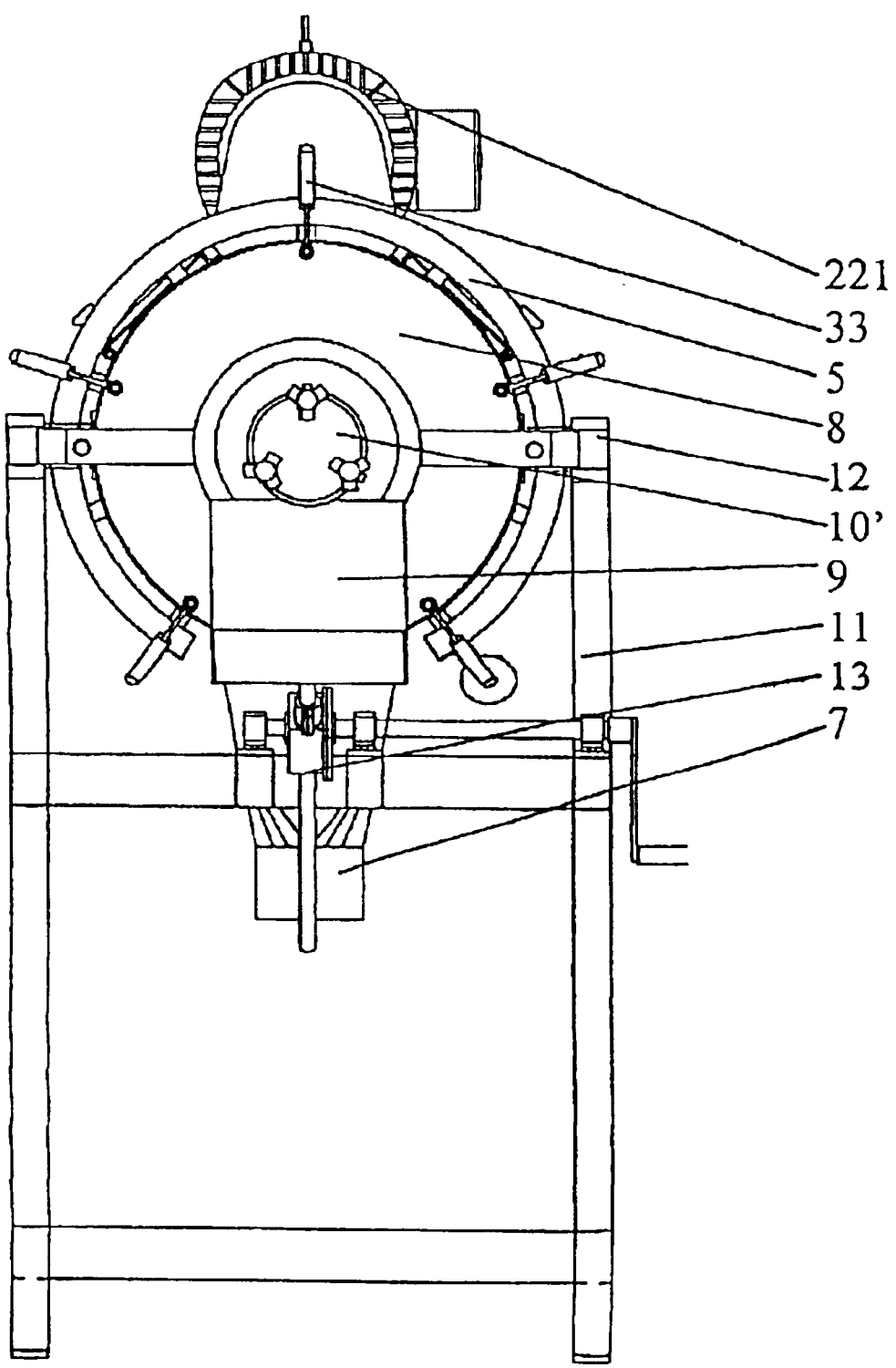
FIG. 2 is a front elevational view of the filter.
Figure 3:
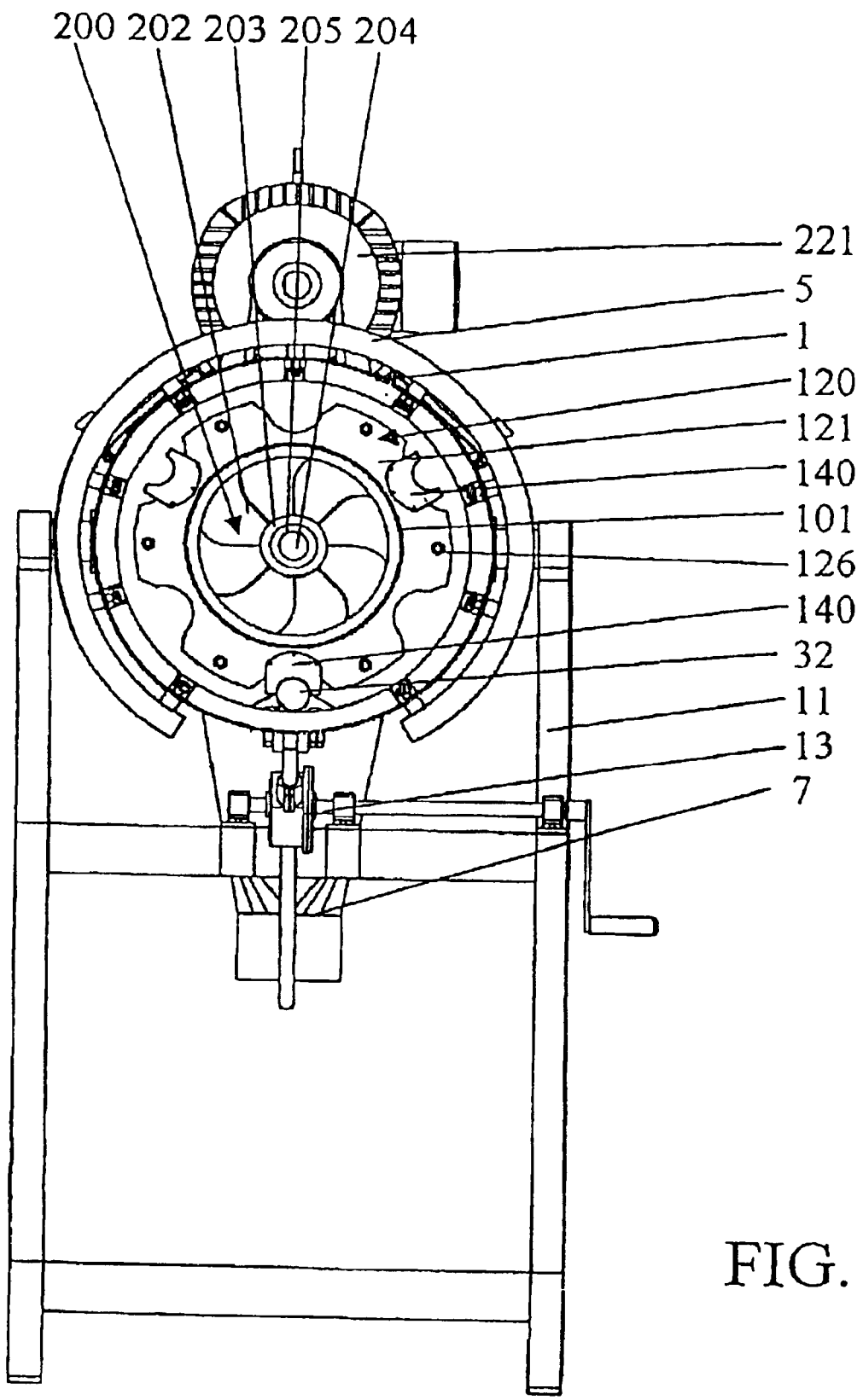
FIG. 3 is a front elevational view with the cap removed.
Figure 4:
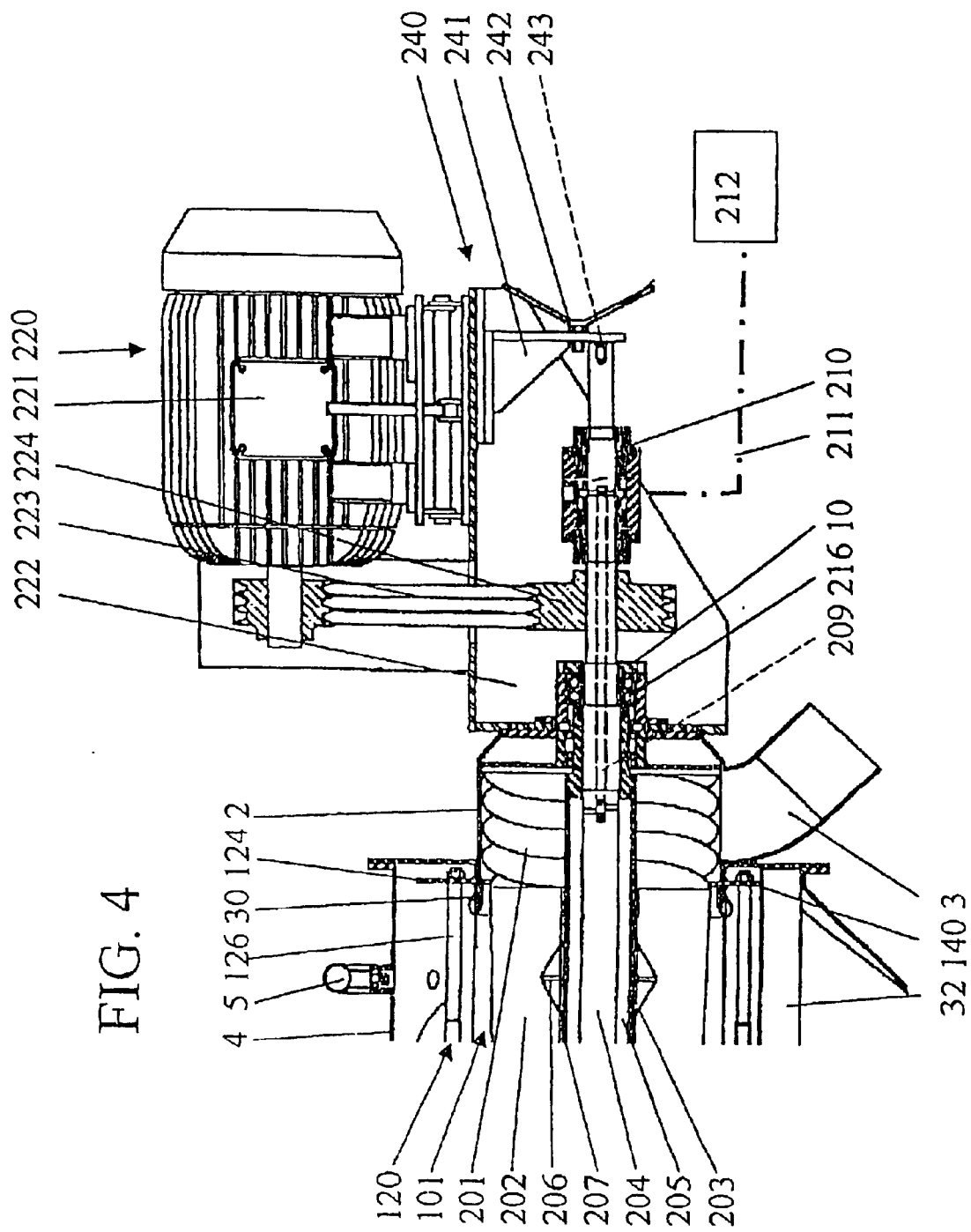
FIG. 4 is an enlarged detailed section of the filter inlet end.
Figure 8A:
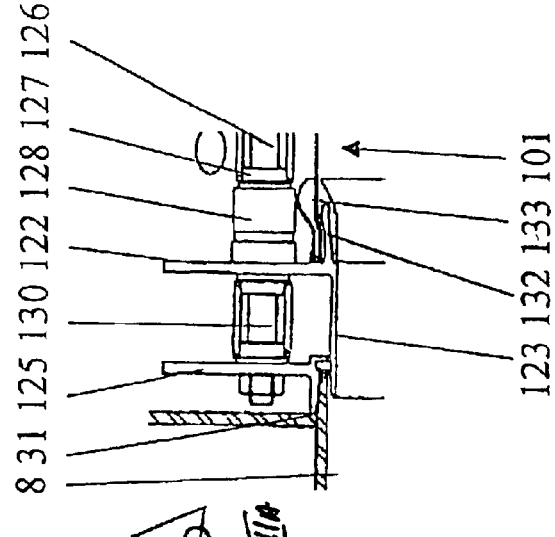
FIG. 8A is the detail VIIIA of FIG. 8.
Figure 8:
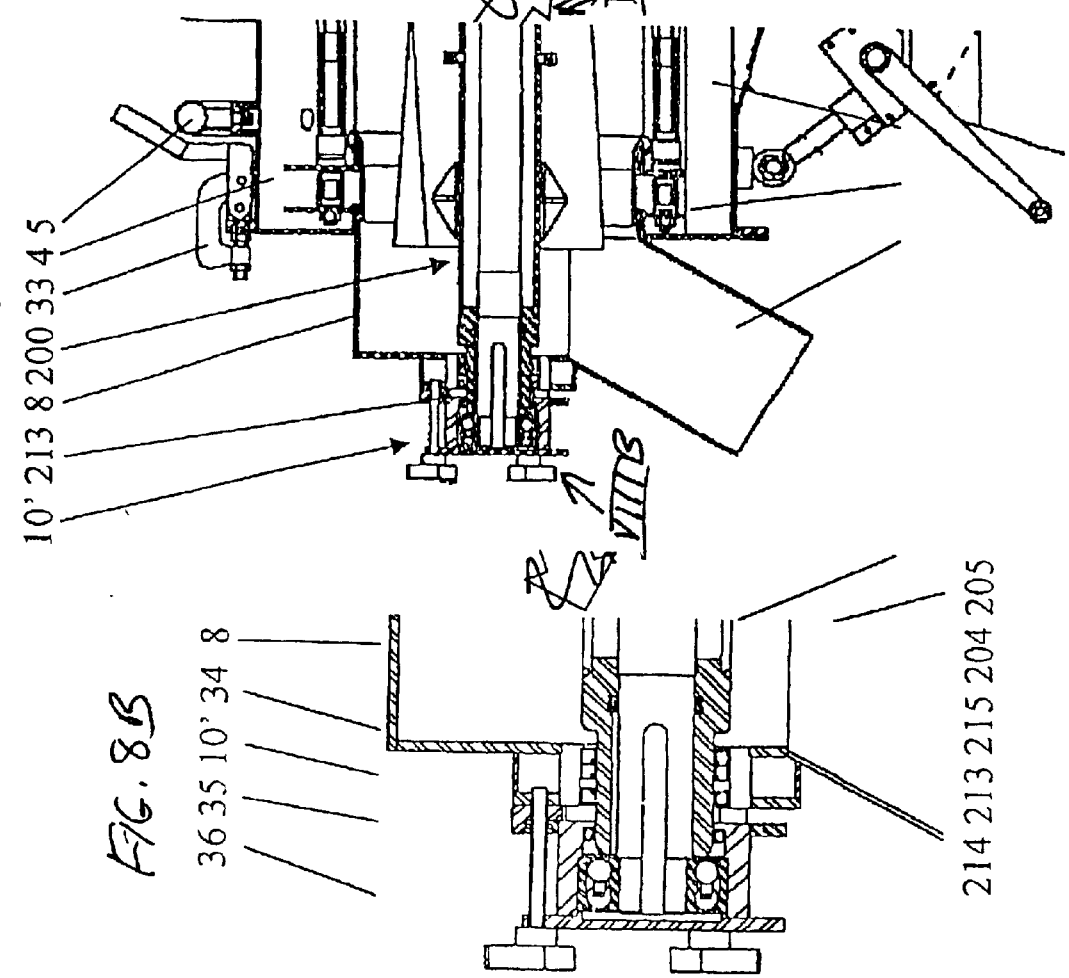
FIG. 8 shows an enlarged detailed section of the outlet end for the solids from the filter.
Figure 8B:
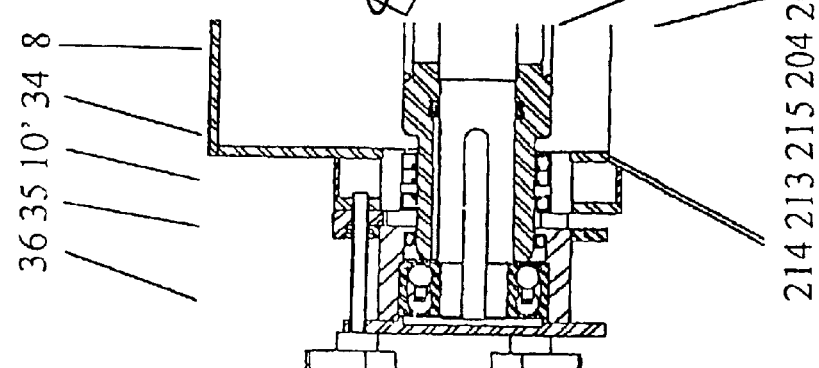
FIG. 8B is the detail VIIIB of FIG. 8.
Figure 9:
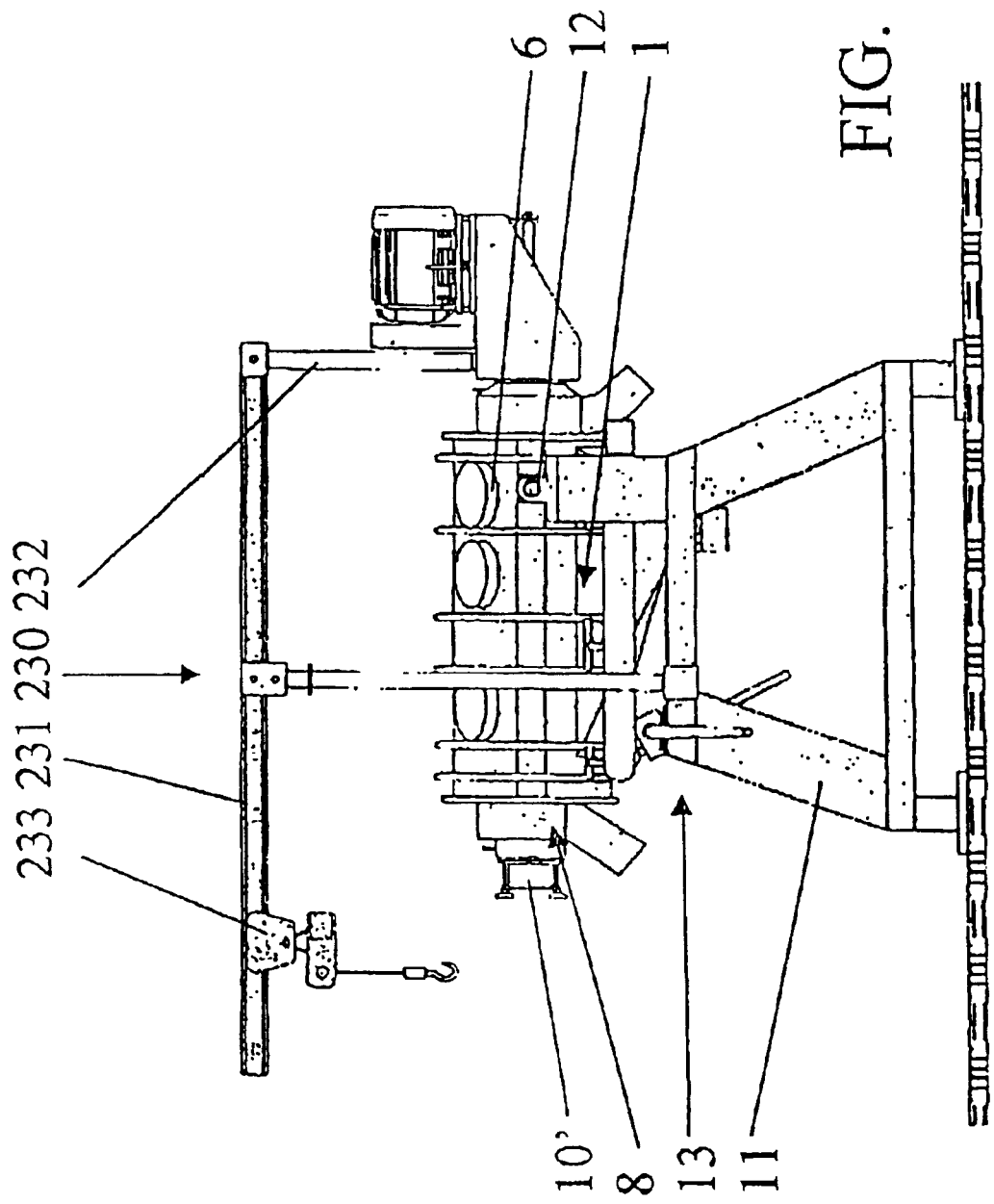
FIGS. 9 to 11 are elevational views which show a filter and a rail device helping the quick assembly/disassembly of the filter and the filter disassembly sequence by using said rail

To meet that need, for quick assembly/disassembly of the filter is provided, essentially comprising the framework 1, which comprises: first ring surface 30 (FIGS. 1A and 4), comprising a short continuation of the inlet chamber 2 to inside the intermediate region 4 of the framework and intended to the support and quick assembly/disassembly of the fixed end flange ring 125 of the outlet end of the filtering element set 100; cylindrical shaft 32 for guiding and support (FIGS. 1A and 3) expanding lengthwise at the lower part of the framework 1; cap 8 opposite the inlet chamber 2, appropriate for quickly assembly/disassembly and, for that purpose, fixed at the end of the intermediate part 4 of the framework 1 by means of snap devices 33, (FIGS. 1A and 2); and housing 10' (FIGS. 1A, 2 and 8).

The housing 10' of cap 8 contains the bearing 213 to support the turbine 200, and is a quick assembly/disassembly housing, essentially comprising: compartment 34 (FIG. 8) incorporated in the cap 8 and housing seals 215; removable compartment 35 housing bearings 214; bolts 36 to fix the removable compartment 35 to the compartment 34 as incorporated in the cap and provided with bundles for quick assembly/disassembly.

The device for quick assembly/disassembly of the filter also comprises the filtering sleeve 101 and resilient support 120 which constitute a monoblock set, which can be fully assembled/disassembled within the filter body. The resilient support 120 comprises the intermediate fixed flange ring 121 and movable flange ring 122 and end fixed flange rings 124 and 125 provided with lower curved cuttings 140 (FIG. 3) covered with a material to facilitate slipping (Teflon). The fixed end flange rings 124 and 125 are externally coupled on the support surfaces and quick assembly/disassembly 30 and 31 of the framework 1 and its cutouts 140 and the fixed ring 121 and movable ring 122 and may slip on the guide and support shaft 32 of the framework 1.

Figure 11:
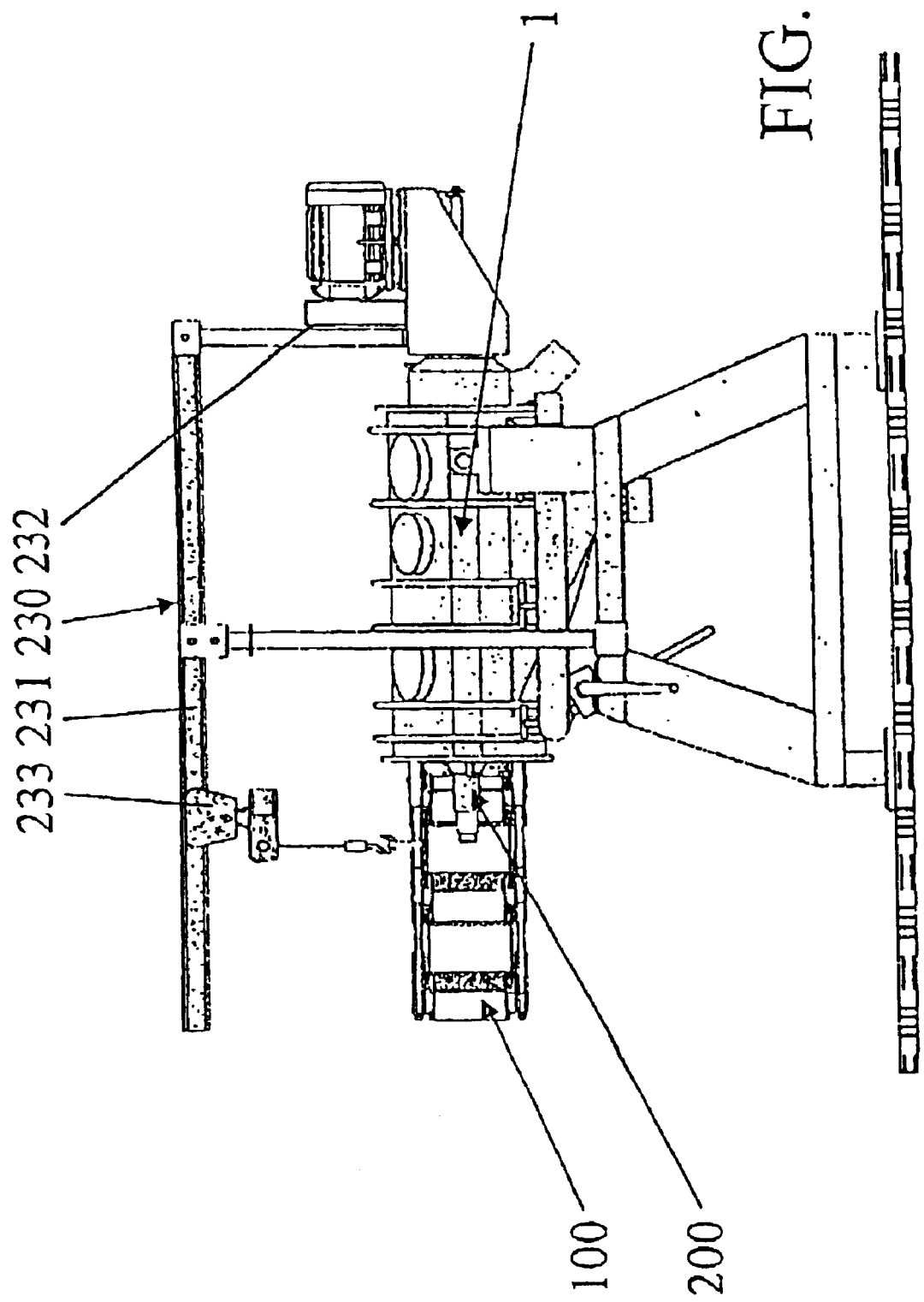

The device for quick filter assembly/disassembly also comprises a rail set 230 (FIGS. 9 to 11) to help the assembly/disassembly.

The rail set can include rail 231 located above and in parallel to the filter and extended to beyond its outlet end for solids, columns 232 supporting the rail and supported on the rack 11 and motor support 222, and a crane 233 running on the rail 231 and equipped with a reel and steel cable, the latter being provided with an end hook which can receive the cap 8 of the framework 1 (FIG. 10) and the monoblock set of filtering sleeve-resilient support 100–120 (FIG. 11) for the quick assembly or disassembly of the filter.

Figure 13:
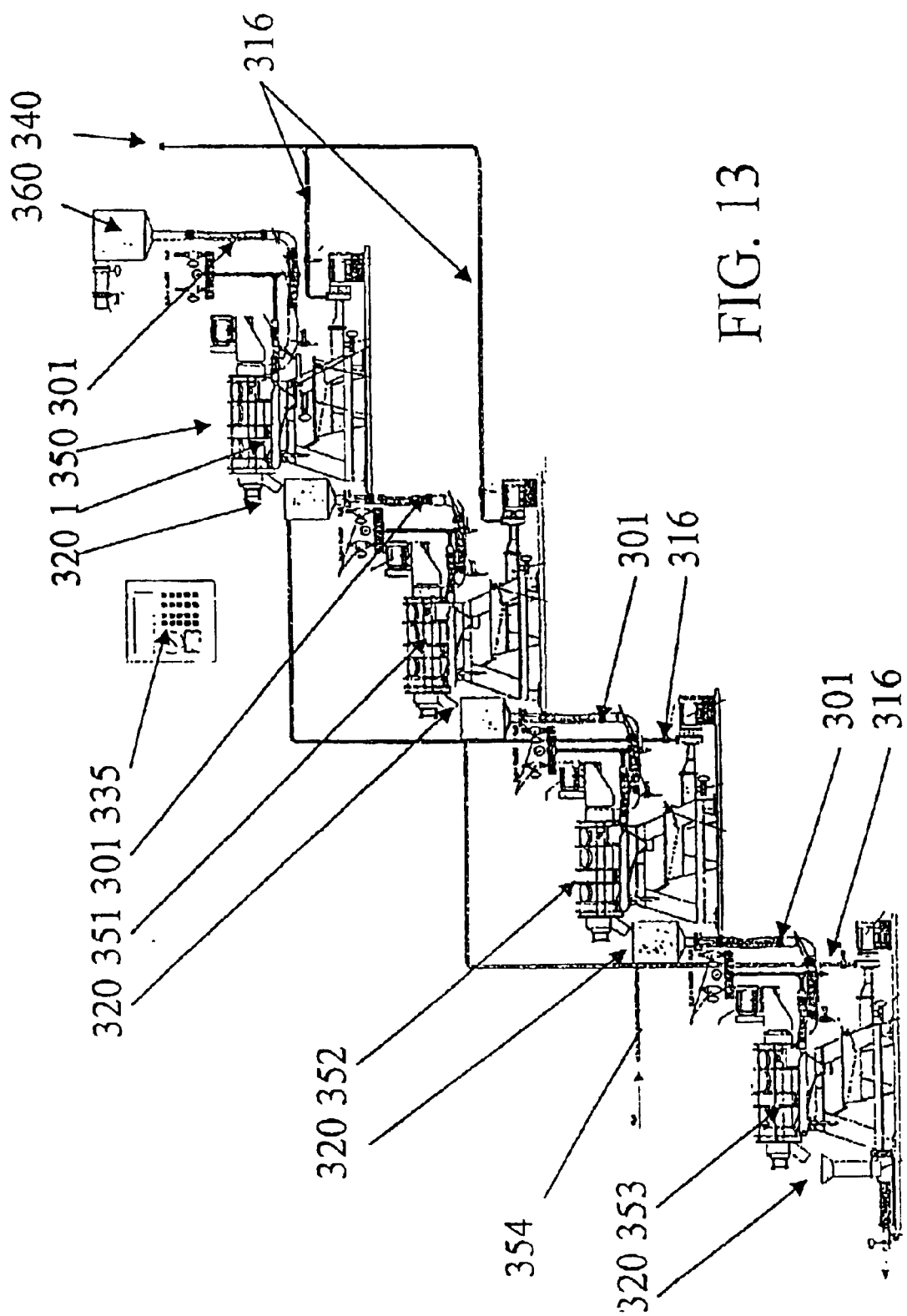
FIG. 13 is an elevational view which shows a number of filters connected in series.

The device for quick filter assembly/disassembly of the filter also comprises a device 240 to support the shaft (FIG. 1A and 4) and comprising a support arm 241 suspended from the support 222, a bolt 242 equipped with an iron glove assembled on the support arm 241 and which may optionally be screwed or unscrewed and taken from a blind hold 243 axially located at the end of the internal part 204 of the turbine shaft 200. As already stated above, the present filter may be employed alone (FIG. 12) or in a set connected in series (FIG. 13). In this case, depending on the product to be filtered and the intended final product, the first filter can have its feeding line 301 connected to a tank 360 fed from e.g. an extractor (not shown) and said first filter and e.g. a subsequent one may have its suppression lines for the outlet of filtered material 316 directly connected to the subsequent stage 340 in the filtering process, e.g. a stage accomplished in an evaporator (not shown) and other filters may be connected to provide for recirculation.

Therefore (FIG. 13), the first filter 350 of a line of e.g. four filters can have its inlet line 301 connected to a tube or tank 360 for the supply of product to be processed, fed e.g. from an extractor (not shown), the outlet line 316 for filtered material connected to an immediately subsequent stage (evaporator) 340 and the outlet line 320 for solid material connected to the inlet of a second filter 351. The second filter 351 has its outlet line for filtered material 316 connected to the following stage 340 and the outlet line 320 for solids connected to the inlet of a third filter 352.

The third filter 352 has its outlet line for filtered material 316 connected to the inlet of the second filter 351 and the outlet for solids 320 connected to the inlet of a fourth filter 353. The fourth filter 353 has its outlet line for filtered material connected to the inlet of the second filter 351 and the outlet for solids 320 connected to a discharge line for solid material. The outlet line for filtered material 316 of the fourth filter is also connected to a line 354 for the supply of water (H$_2$O).

Figure 14:
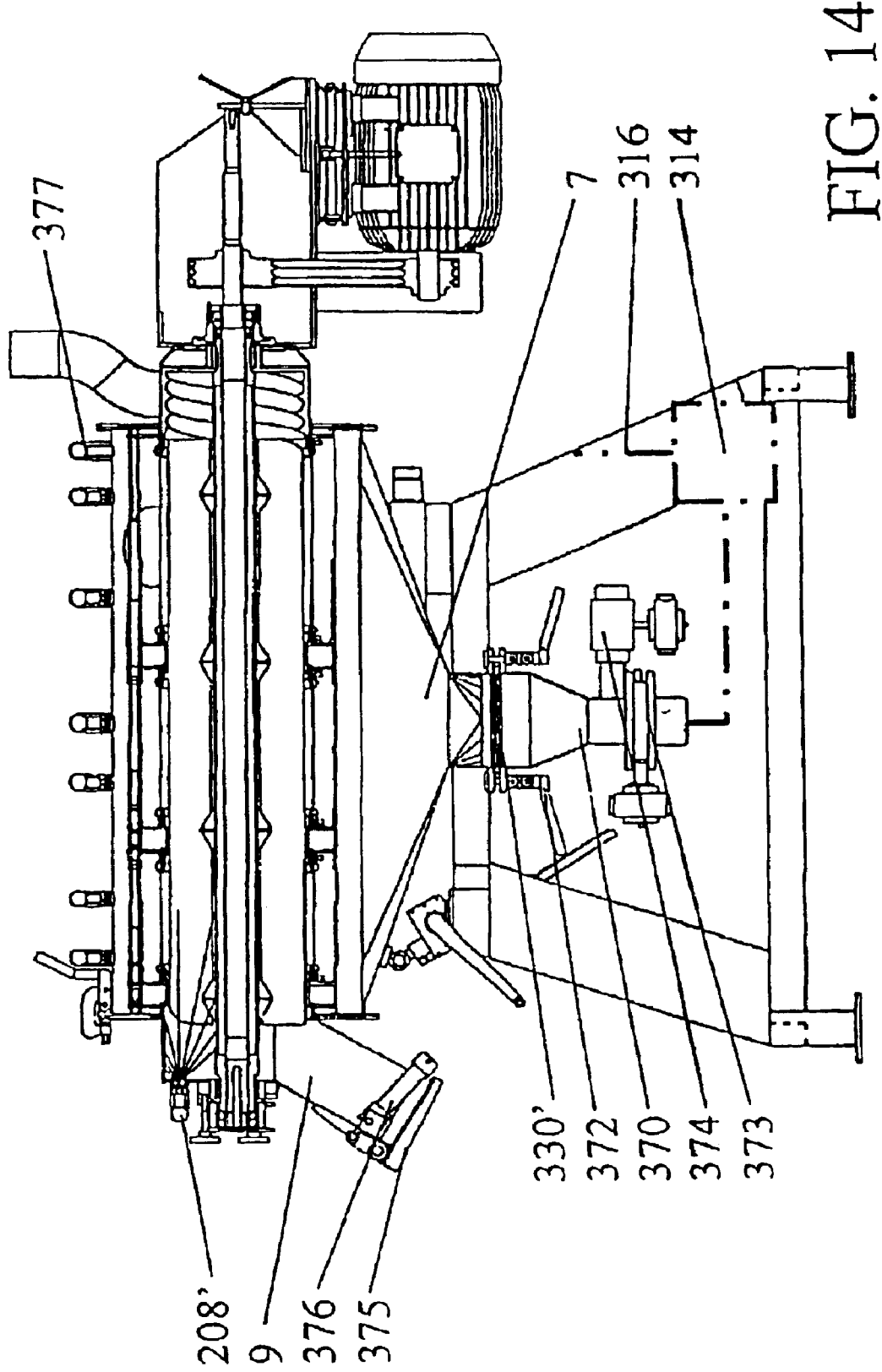
Figure 15:
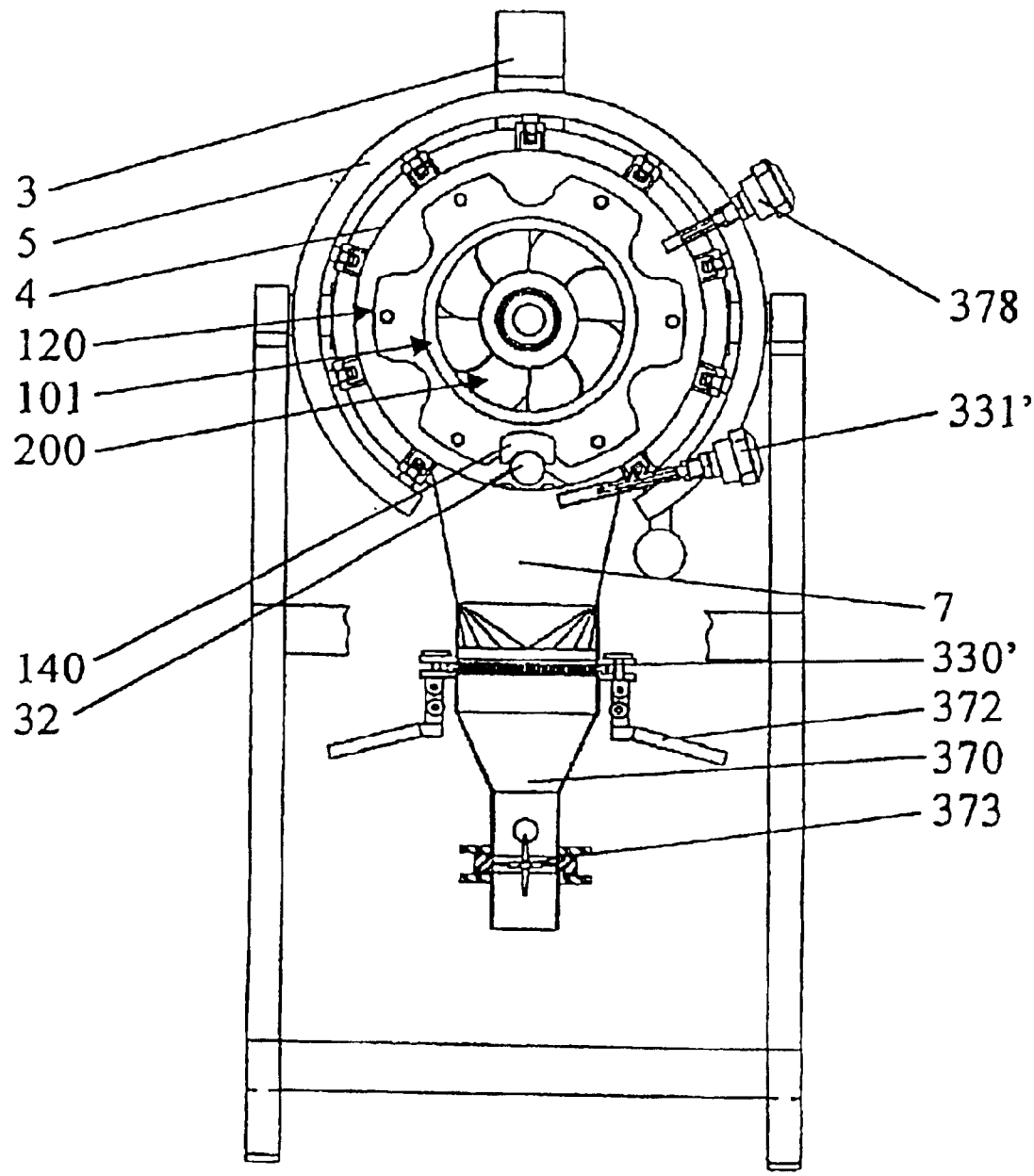

Optionally, one or more filter sets may be connected in a closed circuit (FIGS. 14 to 16). In such a case, inlets of the filters are connected to the feeding lines for the product as usual. However, the outlets 7 for filtered material of the filters do not open into tanks 312 to receive the filtered material, but into outlet lines. Therefore, the outlet for filtered material when the filter works in a closed circuit comprises: an outlet nozzle 7 for a filtered product from the filter, a pulp retaining grill 330' between the outlet nozzle 7 for filtered material and a connection device 370, a juice level sensor (probe) 331' provided at the framework 1 in a place upstream from the pulp retaining grill 330' and downstream from the filtering sleeve 101, a connection device 370 connected to the outlet pump 314 for the filtered material, connected to the suppression line for the filtered material 316 and assembled on a support 371 outstanding from the filter body so that the pump can be tilted when the monkey hammer 13 to regulate the filter inclination is activated. Snapping devices 372 are provided to join the outlet nozzle for filtered product 7, pulp retaining grill 330' and connection 370. An outlet valve set 373 for liquids comprises an air feeding and retention valve, located downstream from the pulp retaining grill 330', and upstream from the pump 314 and, under normal conditions, lets the liquid go out and, in the case of possible rupture of the filtering sleeve, is activated to retain the liquid mixed with the solids, so as to avoid contamination of the remaining line and inject air into the outlet line, so to avoid vacuum formation. The circuit also includes a drain ball valve set 374.

The closed circuit system also comprises the outlets 9 for solid material from the filters, which are connected to inlet lines for solids with inserted outlet pumps 320 for the solids. Outlets for solids may be commanded by corresponding locks 375 moved by corresponding pneumatic cylinders 376 while cleaning.

A part of the closed circuit device is an air-hole 377 equipped with a filter communicating the internal part of the filter with the environment and with the purpose to avoid vacuum formation in the system, as caused by the dynamics of the filtering process itself or of some other canal and a water level sensor (probe) 378 in the framework 1 in an appropriate place to detect water level during the filter cleaning operation.

The product to be filtered comprises a liquid phase and a suspended solid phase, with the latter comprising soluble solids and insoluble solids, e.g. citric juices and the like.

Depending on the characteristics of the product to be filtered, the filter is located in an appropriately tilted position, by means of the monkey hammer device 13, so that gravity can help in the filtering process.

The liquid is fed to the inlet 3 of the filter or set of filters.

The inlet stage 201 of the propeller turbine 200 induces axial movement in the liquid and feeds it into the filtering sleeve 101.

The processing stage 202 of the turbine induces highly intense radial and low axial movement to the liquid, and for that reason the liquid starts to be displaced according in a vortex within the filtering sleeve 101. Therefore, before the liquid passes the sleeve, it flows over its internal surface and, for that reason, the solid material is retained along the whole internal surface of the sleeve up to its solid material outlet, thus providing for the hydrodynamic effect of self-cleaning by rinsing. Simultaneously, the liquid phase passing through the sleeve flows out of the filter through the lower outlet 7 for filtered material and is circulated to the following process stage 340 or recirculated, according to the characteristics of the processing plant of which the filter is a part. The solid material exiting from the filter is fed to the inlet line of a subsequent filter (filters connected in series) or into a discharge tube, according to the processing plant.

The device to separate juice sap (brix) from the liquid works simultaneously with the filtering and self-cleaning operation. Therefore, injecting nozzles 208 are fed with pressured water through the ring chamber 205 duct 209 rotating joint 210 and circuit 211–212, and radially throw water, which goes through the liquid mass circulating inside the sleeve 101 and the solid material therein retained, thus extracting the sap (brix) of said circulating liquid and the retained solid material.

If, eventually, due to the dynamics of the filtering process itself, there is a pressure increase inside the sleeve or filtering sleeve stages 101, the moving flange rings 122 slide within the support rods 126 against the force of the stretching springs 127, which provides that the sleeves axially retract and radially expand to absorb overexpression. After that, springs 127 push the moving flanges 122 to the initial position and the sleeves are again stretched. At the end of the return, moving flanges 122 fall upon the damping gloves or springs 130, and thus the impact is reduced.

When filter maintenance is required, the bearing set 213 of the turbine axis 200, located at the cap 8, is disassembled by means of its bundles and the device 240 to support the axis is taken to the position of which the end of the turbine shaft 200 is supported. The cap 8 is engaged by the crane hook 233 and is loosened from the filter body by means of the snapping devices 33 and removed from alongside the body by means of crane movement 233 on the rail 231. Subsequently, the monoblock set of the filtering sleeve 100, consisting of the sleeve itself 101 and its resilient support 120 is pulled outside the filter body 1, when it then slides over the support and sliding guide set 32. The crane hook 233 is applied to said monoblock set of sleeve 101 and support 120 and this is taken from alongside the filter body. Subsequently, the monoblock set of the filtering sleeve 100, consisting of the sleeve itself 101 and its resilient support 120 is pulled outside the filter body 1, when it then slides over the support and sliding guide set 32. The crane hook 233 is applied to said monoblock set of sleeve 101 and support 120 and this is taken from alongside the filter body. Subsequently, another monoblock sleeve-support set 100-120 previously prepared is assembled in the filter with the help of a rail set 230 and the whole re-assembly operation is done with the help of said rail, within a relatively short time period, thus facilitating the reduction of the interruption period of the equipment.

The filter is cleaned by the automatic counterwashing system and according to a process essentially comprising the following steps: cutting off product feed to be processed; rotation maintenance of the turbine 200 and water feeding through its device to separate juice sap from pulp; counterwashing the filtering sleeve with water, accomplished by means of counterwashing nozzles 5; counterwashing water drainage; counterwashing of the filtering sleeve with water and caustic solution with closing of the outlet for solids, injection of the water and caustic solution until the filter body is filled at the level determined by the sensor 378 and solution drainage through the outlet opening 9 for solids; filtering sleeve rinsing with water and washing the outlet for filtered material; turning off the counterwashing device 5 and cleaning water drainage to sewerage; and re-start of the filter, all by means of activating valves in an appropriate sequence, automatically by computer and its dedicated software.

Within its basic conception as described above, we underline that the filter object of the present patent of invention can present changes concerning materials, dimensions and structural details, without going beyond invention.

I claim:

1. A filter for separating a liquid phase from a solid phase of a suspension, said filter comprising:

a support;

an elongated framework on said support having an inlet for said suspension at one end of said framework, an outlet for solids at an opposite end of said framework and an outlet for a separated product between said ends, said framework having a removable cap at said opposite end;

a device between said support and said framework for controlling a tilt of said framework relative to the horizontal on said support;

a generally cylindrical filter composed of a fabric and extending in said framework from said one end to said opposite end and communicating at said one end with said inlet and at said opposite end with said outlet for solids, said filter being supported in said framework by at least a plurality of movable rings, resilient members and dampers enabling axial extension and contraction of said filter in said framework, said filter, said resilient members, said rings and said dampers forming a unit removable from said framework;

a propeller turbine extending through said filter and supported at least at opposite ends on said framework, and a drive coupled with said turbine at said one end of said framework;

a quick assembly/disassembly mechanism comprising a rail extending along said framework, and a crane displaceable along said rail, and a cable having a hook suspended from said crane engageable with said cap for removing same and affording access to said unit enabling withdrawal of said unit from said framework and reinsertion of a filter unit composed of a filter and respective movable rings, resilient members and dampers; and snap devices between said cap and said framework enabling a quick connect/disconnect connection between said cap and said framework, said cap having a bearing housing in which a bearing journalling a shaft of said turbine is received.

2. A filter for liquid products comprising:

a framework provided with an end inlet for a product to be processed, a lower intermediate outlet for filtered material, a cap opposite the inlet, an outlet for solids, and housings for bearings;

counterwashing nozzle set on said framework;

a rack supporting a filter element, said filter element being provided with an end communicating with said inlet, an intermediate part located above and communicating with said outlet for filtered material and an opposite end communicating with the outlet for solid material;

a propeller turbine for the product to be processed supported on bearings in said housings and provided with an inlet part located near said inlet and a processing part located inside the filter element; and a hydraulic circuit, said framework being generally cylindrical and a first ring surface, a second ring surface, a longitudinal cylindrical shaft for guiding and support and snaps for the cap;

said filter element comprising a filtering sleeve, a resilient support on which the filtering sleeve is mounted and enabling the sleeve to axially contract and radially expand, so to absorb eventual internal pressure increases to the sleeve, said resilient support having a fixed end and a moving end provided with fixed and movable flange rings in a telescope configuration and covered with a material to facilitate slipping;

said propeller turbine comprising an inlet part, and a processing path located inside the filtering sleeve incorporating a device to generate controlled turbulence for solids suspended in the liquid;

a hydrodynamic self-cleaning device being provided for the filtering sleeve and adapted to separate brix, providing for product filtering, self-cleaning of the filtering sleeve and the separation of the brix simultaneously within the filters said filtering device constructed and arranged for quick assembly/disassembly of the filter with a monoblock set of said filtering element with said fixed and moving ends and flange rings so that said flange rings are supported and quickly assembled/disassembled on said ring surfaces of the framework and with a rail set to lift and displace the cap of the framework and the filtering element monoblock set in the assembly/disassembly operations; and said hydraulic circuit comprising lines for feeding of the product to be filtered, filtered material removal, retained solids removal, washing and counterwashing and a safety device against filtering sleeve disruptions, all commanded by a dedicated computer and enabling the filter to work in open or closed circuit.

3. The filter defined in claim 2, further comprising:

a device to regulate filter inclination, comprising: hinges alongside the framework and to connect it to the rack; and a monkey hammer set located under the end of the framework containing the outlet for solid material.

4. The filter defined in claim 2 in which the filtering sleeve has an end communicating with an inlet chamber at said inlet for the product to be filtered; said filtering sleeve consisting of canvas woven with substantially circular section wires.

5. The filter defined in claim 2 in which the resilient support substantially comprises: fixed intermediate flange rings on which the ends of the sleeve stages turned to the filter feeding inlet are supported; moving intermediate flange rings, on which the opposed ends of the sleeve stages, turned to the outlet for solids of the filter, are mounted; said moving intermediate flange rings having ring projections packed as a telescope within the immediately adjacent fixed intermediate flange rings; fixed end flange ring, on which an inlet end of the first filtering sleeve stage is supported and mounted on the second ring surface adjacent to the inlet chamber; fixed end flange ring, on which the outlet end of a last sleeve stage is mounted which is located on the first ring surface and within which ring path of the adjacent moving intermediate flange ring is packed as a telescope; at least three support stringers, located lengthwise inside the framework, arranged around the filtering sleeve equally distant from each other, said stringers going through peripheral openings of the flange rings; said fixed intermediate flange rings being assembled fixed on said support stringers; said moving intermediate flange rings being slidingly assembled; said fixed end flange rings being assembled fixed on the ends of support stringers; said resilient support also comprising: springs stretching filtering sleeve stages and located around parts of the support stringers, located between the fixed and moving or fixed and moving flanges; one of the ends of said springs being located against a region of the moving flange ring or against a bush of resilient material located between the spring and the flange and around the support stringers; nuts to regulate spring pressure on screws of the support stringers and against which the ends of said stretching springs opposite to those adjacent the flange or bushes are braced.

6. The filter defined in claim 5 in which the resilient support set also comprises bumpers consisting of resilient members assembled around the support stringers, located between the moving flange ring of a sleeve stage and a fixed flange ring of a subsequent stage of the filtering sleeve or between the moving flange ring and the fixed ring of an end of the resilient support next to the outlet for solids.

7. The filter defined in claim 2 in which the filtering sleeve on the resilient support comprises stages, each one comprising: a filtering sleeve path; a fixed flange ring and moving ring, which are at opposite ends of the filtering sleeve path and on support stringers; stretching spring sets and tensioning nuts; and the bumper sets.

8. The filter defined in claim 7 in which the filtering sleeve within the fixed moving flange rings is fixed by a fixing device essentially comprising; a ring-shaped rim, orthogonally stretched from the flange ring face; a vulcanized rubber housing at said ring-shaped rim; a reinforced end of the filtering sleeve, externally mounted on said rubber housing; a rubber reinforcement ring on said reinforced end of the sleeve; and a handle externally encompassing the reinforcing rubber ring.

9. The filter defined in claim 8 in which the rubber housing has an external surface defined by an end region of smaller diameter located next to a flange ring and axially extended to an intermediate region with increased diameter and extending axially until an opposite end region with greater diameter and low axial extension; the reinforced end of the sleeve being adjusted on said external surface and following its profile, the internal surface of the reinforcing rubber ring also following the reinforced end profile of the sleeve, the reinforcing ring having an external surface defined by the substantially curved concave part with smaller diameter, adjacent to a flange ring, with a free edge against an edge rim of a sleeve reinforcement and, said external surface of the reinforcing ring extending axially and conforming to a curved convex part with smaller diameter, the handle encompassing said curved concave part of the external surface of the rubber reinforcing ring and is retained between a surface of a flange ring and said part of curved convex surface of the rubber reinforcing ring.

10. The filter defined in claim 8 in which the reinforced end of the filtering sleeve consists of a strip-shaped blanket provided with: a ring part covering the internal surface of the sleeve and; a fold incorporating the rib located at the edge of the sleeve end; and a ring-shaped part covering the external surface of the sleeve end, with said strip-shaped blanket being fixed at the sleeve end by means of two parallel and stretched circumference-shaped seam lines; and a zigzag seam line, with oblique parts located at a 30° angle from each other which, on one side, form vertexes over the circumference-shaped seam line located nearer to a free end of the sleeve and said oblique parts cross another circumference-shaped seam line which is more distant from the end of the sleeve.

11. The filter defined in claim 2 wherein the propeller turbine comprises: a short inlet-turbine path located within an inlet of the inlet for the product to be filtered and able to impose axial thrust and substantially no radial thrust for a liquid entering via the inlet; a long processing turbine path, located throughout an internal part of the filter element and able to impose highly intense radial thrust and low axial thrust to the liquid, thus providing liquid circulation with a vortex within the filter element and a self-washing effect by rinsing, as well as the passage of the liquid through the sleeve and its filtering; said propeller turbine also comprises an external shaft comprising: an external tube path, over which blades of the turbine paths are located; an internal shaft located inside the external shaft; and a ring chamber defined between the shafts which is a part of a device to separate the brix from the pulp of the filtered product; one of the ends of said shafts being supported on a removable bearing set located within a housing of the cap of the framework; and opposite part of the shafts being supported through a bearing set in a housing of an inlet chamber wall of the opposite end of the framework, the external shaft having: a pulley, which is a part of an operation set; a turning joint, which is a part o the device to separate the brix and part of the device to support the shafts for quick assembly/disassembly of the filter.

12. The filter defined in claim 11 wherein the long processing turbine path comprises: four helicoidal blades extending around the shafts, which have convex trailing surfaces; keeping a space related to the internal surface of the filter element; supports substantially in the shape of pairs of cones connected by their larger bases, incorporated to the shafts and which have grooves in which the blades are disposed, and spaces defined between the axis surface and blade edges, intended to absorb pressure peaks generated during turbine action.

13. The filter defined in claim 11 wherein the bearing set to support the end of the shafts together within the cap of the framework essentially comprises: bearings which receive an end of the shafts; and a sealing set sealing against the shafts, located inside the housing of the cap; said housing in said cap comprising: a compartment incorporated to the cap and housing seals; a removable compartment housing bearings; bolts to fix the removable compartment to the compartment incorporated to the cap and provided with means for quick assembly/disassembly.

14. The filter defined in claim 11 wherein the operation set comprises: an electric motor located on a support provided on an inlet end of the filter, and a transmission set comprising a belt coupled to the motor and the pulley of the propeller turbine shafts.

15. The filter defined in claim 11 wherein said shafts are supported during assembly/disassembly by a support arm suspended from the support; a bolt equipped with an iron sleeve assembled on the support arm and which may optionally be screwed or unscrewed and taken from an end non-passing hole axially located at the end of the internal part of the shafts of the turbine.

16. The filter defined in claim 11 wherein the device to separate brix from the pulp of the filtered product comprises a ring chamber; injecting nozzles radially of the ring chamber; a duct located in a part of the internal shaft and communicating with the ring chamber with a rotating joint external of the framework; said rotating joint, within which the part of internal shaft rotates communicating at an internal duct with a circuit supplying pressured water to separate sap from pulp and of which a motor-pump set is a part.

17. The filter defined in claim 2 wherein the device to separate brix from the pulp of the filtered product optionally comprises injecting nozzles located at the cap and injecting pressured water through the outlet for solids of the filter element, said nozzles being connected to a circuit for feeding pressured water.

18. The filter defined in claim 2 in which the rail set for quick assembly/disassembly comprises: a rail located above and in parallel to the filter extending to its outlet for solids; columns supporting the rail; and a crane running on the rail and equipped with a reel and steel cable provided with an end hook which can receive the cap of the framework and the monoblock set for the quick assembly or disassembly of the filter.

19. The filter defined in claim 2 wherein the circuit to feed the product to be filtered, take out the filtered material, take out the retained solids, counterwashing and washing comprises tubes to feed the product to be filtered, connected to the inlet and having sequentially inserted from said inlet: a flow meter; a drain with a manual valve; a tank for storage of the product to be filtered; an automatic valve and a manual valve; provided at the tank inlet.

20. The filter defined in claim 19 wherein the circuit comprises exit tubes for the filtered material; tubes to feed filter counterwashing nozzles and to which tubes for water and caustic solution are alternatively connected and a drain with a manual valve connected to the tubes to feed the filter counterwashing nozzles.

21. The filter defined in claim 19 wherein the circuit further comprises a safety device against disruption of the filtering element comprising: a pulp retaining grill assembled within an outlet tank for filtered material at an appropriate distance from an opening thereof; and a level sensor provided above the pulp retaining grill.

22. The filter defined in claim 19 wherein the circuit further comprises a dedicated software based computer connected to automatic valves, pumps and a level sensor to wash and counterwash the filter and monitor disruption of the filter element.

* * * * *